United States Patent
Black et al.

(10) Patent No.: US 10,395,411 B2
(45) Date of Patent: Aug. 27, 2019

(54) SKINNED MULTI-PERSON LINEAR MODEL

(71) Applicant: Max-Planck-Gesellschaft zur Förderung der Wissenschaften e.V., Munich (DE)

(72) Inventors: Michael J. Black, Tuebingen (DE); Matthew Loper, San Francisco, CA (US); Naureen Mahmood, Tuebingen (DE); Gerard Pons-Moll, Tuebingen (DE); Javier Romero, Tuebingen (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 50 days.

(21) Appl. No.: 15/739,658

(22) PCT Filed: Jun. 23, 2016

(86) PCT No.: PCT/EP2016/064610
§ 371 (c)(1),
(2) Date: Dec. 22, 2017

(87) PCT Pub. No.: WO2016/207311
PCT Pub. Date: Dec. 29, 2016

(65) Prior Publication Data
US 2018/0315230 A1    Nov. 1, 2018

Related U.S. Application Data

(60) Provisional application No. 62/183,853, filed on Jun. 24, 2015.

(51) Int. Cl.
*G06T 7/73* (2017.01)
*G06T 13/40* (2011.01)
(Continued)

(52) U.S. Cl.
CPC ............... *G06T 13/40* (2013.01); *G06T 7/75* (2017.01); *G06T 17/00* (2013.01); *G06T 19/20* (2013.01);
(Continued)

(58) Field of Classification Search
None
See application file for complete search history.

(56) References Cited

U.S. PATENT DOCUMENTS

| 5,883,638 A | 3/1999 | Rouet et al. |
| 8,797,328 B2 | 8/2014 | Corazza et al. |
| 2014/0375635 A1* | 12/2014 | Johnson ................. G06T 17/20 345/420 |

OTHER PUBLICATIONS

Allen, B., et. al., Articulated Body Deformation From Range Scan Data, Proceedings of the 29th Annual Conference on Computer Graphics and interactive Techniques, SIGGRAPH, 2002, pp. 612-619.
(Continued)

*Primary Examiner* — Frank S Chen
(74) *Attorney, Agent, or Firm* — Knobbe, Martens, Olson & Bear, LLP

(57) ABSTRACT

The invention comprises a learned model of human body shape and pose dependent shape variation that is more accurate than previous models and is compatible with existing graphics pipelines. Our Skinned Multi-Person Linear model (SMPL) is a skinned vertex based model that accurately represents a wide variety of body shapes in natural human poses. The parameters of the model are learned from data including the rest pose template, blend weights, pose-dependent blend shapes, identity-dependent blend shapes, and a regressor from vertices to joint locations. Unlike previous models, the pose-dependent blend shapes are a linear function of the elements of the pose rotation matrices. This simple formulation enables training the entire model
(Continued)

from a relatively large number of aligned 3D meshes of different people in different poses. The invention quantitatively evaluates variants of SMPL using linear or dual-quaternion blend skinning and show that both are more accurate than a Blend SCAPE model trained on the same data. In a further embodiment, the invention realistically models dynamic soft-tissue deformations. Because it is based on blend skinning, SMPL is compatible with existing rendering engines and we make it available for research purposes.

26 Claims, 16 Drawing Sheets

(51) Int. Cl.
G06T 17/00 (2006.01)
G06T 19/20 (2011.01)
(52) U.S. Cl.
CPC ............... G06T 2207/30196 (2013.01); G06T 2219/2021 (2013.01)

(56) References Cited

OTHER PUBLICATIONS

Allen, B., et. al., The Space of Human Body Shapes: Reconstruction and Parameterization from Range Scans, ACM SIGGRAPH, 2003, pp. 587-594.
Allen, B., et. al., Learning a Correlated Model of Identity and Pose-dependent Body Shape Variation for Real-Time Synthesis, ACM SIGGRAPH/Eurographics Symposium on Computer Animation, 2006, pp. 147-156.
Anguelov, D., et. al., SCAPE: Shape Completion and Animation of People, ACM SIGGRAPH, 2005, pp. 408-416.
Baran, I., et. al., Automatic Rigging and Animation of 3D Characters, ACM SIGGRAPH 26,3, 2007, Article No. 72.
Bogo, F., et, al., FAUST: Dataset and Evaluation for 3D Mesh Registration, IEEE Conference on Computer Vision and Pattern Recognition (CVPR), 2014, pp. 3794-3801.
Chang, W., et. al., Range Scan Registration Using Reduced Deformable Models, Computer Graphics Forum 28,2, 2009, pp. 447-456.
Chen, Y., et. al., Tensor-based Human Body Modeling, IEEE Conference on Computer Vision and Pattern Recognition (CVPR), 2013 pp. 105-112. CMU Graphics Lab Motion Capture Database, http://mocap.cs.cmu.edu. Accessed: Dec. 11, 2012.
De Aguiar, S., et. al., Automatic Conversion of Mesh Animations into Skeleton-based Animations, Computer Graphics Forum 27,2, 2008 pp. 389-397.
Dyna dataset, http://dyna.is.tue.mpg.de/. Accessed: Jun. 14, 2018.
Freifeld, O., et. al., Lie Bodies: A Manifold Representation of 3D Human Shape, European Conference on Computer Vision (ECCV), Springer-Verlag, A. Fitzgibbon et. al. (Eds.), Ed., Part I, 2012, LNCS 7572, pp. 1-14.
Hasler, N., et. al., A Statistical Model of Human Pose and Body Shape, Computer Graphics Forum 28,2, 2009, pp. 337-346.
Hasler, N., et. al., Learning Skeletons for Shape and Pose, Proceedings of the 2010 ACM SIGGRAPH Symposium on Interactive 3D Graphics and Games, pp. 23-30.
Hirshberg, D., et. al., Coregistration: Simultaneous Alignment and Modeling of Articulated 3D Shape, European Conference on Computer Vision (ECCV), Springer-Verlag, A.F. et. al. (Eds.), Ed., LNCS 7577, Part IV, 2012, pp. 242-255.
James, D.L., et. al., Skinning Mesh Animation, ACM Transaction of Graphics, 24, 3, 2005, pp. 399-407.
Kavan, L., et. al., Spherical Blend Skinning: A Real-time Deformation of Articulated Models, Proceedings of the 2005 Symposium on Interactive 3D Graphics and Games, ACM, pp. 9-16.
Kavan, L., et. al., Geometric Skinning with Approximate Dual Quaternion Blending, ACM Transactions on Graphics (TOG) 27, 4, 2008, Article No. 105.
Kavan, L., et. al., Automatic Linearization of Nonlinear Skinning, Proceedings of the 2009 Symposium on Interactive 3D Graphics and Games, ACM, pp. 49-56.
Kry, P.G., et. al., EigenSkin: Real Time Large Deformation Character Skinning in Hardware, Proceedings of the 2002 ACM SIGGRAPH/Eurographics Symposium on Computer Animation, pp. 153-159.
Kurihara, T., et. al., Modeling Deformable Human Hands From Medical Images, Proceedings of the 2004 ACM SIGGRAPH/Eurographics Symposium on Computer Animation, Eurographics Association, pp. 355-363.
Lawson, C., et. al., Solving Least Squares Problems, Classics in Applied Mathematics, SIAM: Society of Industrial and Applied Mathematics, 1995.
Le, B.H.., et. al., Smooth Skinning Decomposition with Rigid Bones, ACM Transaction on Graphics 31,6, 2012, Article 199:1-199:10.
Le, B.H.., et. al., Robust and Accurate Skeletal Rigging from Mesh Sequences, ACM Transaction on Graphics 33,4, 2014 Article 84:1-84:10.
Lewis, J.P. et. al., Pose Space Deformation: A Unified Approach to Shape Interpolation and Skeleton-Driven Deformation, Proceeding of the 27th Annual Conference on Computer Graphics and Interactive Techniques, ACM Press/Addison-Wesly Publishing Co., New York, NY, 2000, pp. 165-172.
Loper, M.M., et. al., OpenDR: An Approximate Differentiable Renderer, Computer Vision—ECCV, Springer International Publishing, vol. 8695, 2014 pp. 154-169.
Loper, M.M., et. al., MoSh: Motion and Shape Capture from Sparse Markers, ACM Transaction on Graphics 33, 6, 2014 Article 220:1-220:13.
Merry, B., et. al., Animation Space: A Truly Linear Framework for Character Animation, ACM Transaction on Graphics 25, 4, 2006 pp. 1400-1423.
Miller, C., et. al., Frankenrigs: Building Character Rigs from Multiple Sources, Proceedings 2010 ACM SIGGRAPH Symposium on Interactive 3D Graphics and Games, New York, NY, 2010 pp. 31-38.
Mohr, A., et. al., Building Efficient, Accurate Character Skins from Examples, ACM Transaction on Graphics, 2003, pp. 562-568.
Nocedal, J., et. al., Numerical Optimization, 2nd ed. Springer, New York, 2006.
Pons-Moll, G., et. al., Dyna: A Model of Dynamic Human Shape in Motion, ACM Transaction on Graphics, 2015, Article 120:1-120:14.
Rhee, T., et. al., Real-Time Weighted Posespace Deformation on the GPU, EUROGRAPHICS 25,3, 2006.
Robinette, K., et. al., Civilian American and European Surface Anthropometry Resource (CAESAR) Final Report, AFRL-HE-WP-TR-2002-0169, US Air Force Research Laboratory, 2002.
Schaefer, S., et. al., Example-Based Skeleton Extraction, Proceedings of the Fifth Eurographics Symposium on Geometry Processing, Eurographics Association, Airela-Ville, Switzerland, 2007, pp. 153-162.
Seo, H., et. al., Synthesizing Animatable Body Models with Parameterized Shape Modifications, Proceedings of the 2003 ACM SIGGRAPH/Eurographics Symposium on Computer Animation, Eurographics Association, Aire-la-Ville, Switzerland, 2003, pp. 120-125.
Tsoli, A., et. al., Breathing Life into Shape: Capturing, Modeling and Animating 3D Human Breathing, 33, ACM Transaction of Graphics, 2014, 52:1-52:11.
Wang, X.C., et. al., Multi-weight enveloping: Least Squares Approximation Techniques for Skin Animation, Proceedings of the 2002 ACM SIGGRAPH/Eurographics Symposium of Computer Animation, ACM, New York, 2002, pp. 129-138.
Wang, R.Y., et. al., Real-Time Enveloping with Rotational Regression, ACM Transactions of Graphics, 26, 3, 2007.
Weber, O., et. al., Context-Aware Skeletal Shape Deformation, Computer Graphics Forum, 26, 3, 2007, pp. 265-274.

* cited by examiner

SKINNED MULTI-PERSON LINEAR MODEL

CROSS-REFERENCE TO RELATED APPLICATION

This application is the U.S. National Phase under 35 U.S.C. § 371 of International Application PCT/EP2016/064610, filed Jun. 23, 2016, titled SKINNED MULTI-PERSON LINEAR MODEL, which claims the benefit of U.S. Provisional Application No. 62/183,853, titled SKINNED MULTI-PERSON LINEAR MODEL, filed on Jun. 24, 2015, which is hereby incorporated by reference herein in its entirety.

The present invention relates to realistic digital models of animated human bodies that can represent different body shapes, deform naturally with pose, and exhibit soft-tissue motions like those of real humans.

INTRODUCTION AND RELATED WORK

It is desirable that such models are fast to render, easy to deploy, and compatible with existing rendering engines.

Linear blend skinning and blend shapes are widely used throughout the animation industry. The commercial approach commonly involves hand rigging a mesh and manually sculpting blend shapes to correct problems with traditional skinning methods. Many blend shapes are typically needed and the manual effort required to build them is large.

As an alternative, the research community has focused on learning statistical body models from example scans of different bodies in a varied set of poses. While promising, these approaches are not compatible with existing graphics software and rendering engines that use standard skinning methods.

Many authors have tried to bring these worlds together with varying degrees of success.

Traditional methods model how vertices are related to an underlying skeleton structure. Basic linear blend skinning (LBS) models are the most widely used, are supported by all game engines, and are efficient to render. Unfortunately, they produce unrealistic deformations at joints including the well-known taffy and bowtie effects. Work has gone into skinning methods that ameliorate these effects [Lewis et al. 2000; Wang and Phillips 2002; Kavan and ára 2005; Merry et al. 2006; Kavan et al. 2008]. There has also been a lot of work on learning realistic body models from data [Allen et al. 2006; Anguelov et al. 2005; Freifeld and Black 2012; Hasler et al. 2010; Chang and Zwicker 2009; Chen et al. 2013]. These methods can capture the body shape of many people as well as non-rigid deformations due to pose. The most successful approaches are so far based on triangle deformations [Anguelov et al. 2005; Chen et al. 2013; Hasler et al. 2010; Pons-Moll et al. 2015]. Despite the above research, existing models either lack realism, do not work with existing packages, do not represent a wide variety of body shapes, are not compatible with standard graphics pipelines, or require significant manual labor.

Blend Skinning.

Skeleton subspace deformation methods also known as blend skinning, attach the surface of a mesh to an underlying skeletal structure. Each vertex in the mesh surface is transformed using a weighted influence of its neighboring bones. This influence can be defined linearly as in Linear Blend Skinning (LBS). The problems of LBS have been widely published and the literature is dense with generic methods that attempt to fix these, such as quaternion or dual-quaternion skinning, spherical skinning, etc. (e.g. [Wang and Phillips 2002; Kavan and ára 2005; Kavan et al. 2008; Le and Deng 2012; Wang et al. 2007]). Generic methods, however, often produce unnatural results.

Auto-Rigging.

There is a great deal of work on automatically rigging LBS models (e.g. [De Aguiar et al. 2008; Baran and Popovic 2007; Corazza and Gambaretto 2014; Schaefer and Yuksel 2007]) and commercial solutions exist. Most relevant here are methods that take a collection of meshes and infer the bones as well as the joints and blend weights (e.g. [Le and Deng 2014]). Such methods do not address the common problems of LBS models because they do not learn corrective blend shapes. Models created from sequences of meshes (e.g. [De Aguiar et al. 2008]) may not generalize well to new poses and motions The key limitation of the above methods is that the models do not span a space of body shapes. Miller et al. [2010] partially address this by auto-rigging using a database of pre-rigged models. They formulate rigging and skinning as the process of transferring and adapting skinning weights from known models to a new model. Their method does not generate blend shapes, produces standard LBS artifacts, and does not minimize a clear objective function.

Blend Shapes.

To address the shortcomings of basic blend skinning, the pose space deformation model (PSD) [Lewis et al. 2000] defines deformations (as vertex displacements) relative to a base shape, where these deformations are a function of articulated pose. This is largely followed by later approaches and is referred to as scattered data interpolation and corrective enveloping [Rouet and Lewis 1999]. Another approach is weighted pose-space deformation (WPSD) [Kurihara and Miyata 2004; Rhee et al. 2006], which defines the corrections in a rest pose and then applies a standard skinning equation (e.g. LBS). The idea is to define corrective shapes (sculpts) for specific key poses, so that when added to the base shape and transformed by blend skinning, produce the right shape. Typically, one finds the distance (in pose space) to the exemplar poses and uses a function, e.g. a Radial Basis (RBF) kernel [Lewis et al. 2000], to weight the exemplars non-linearly based on distance. The sculpted blend shapes are then weighted and linearly combined. In practice however, a large number of poses might be needed to cover the pose space well. This makes animation slow since the closest key poses have to be found at run time.

These approaches are all based on computing weighted distances to exemplar shapes. Consequently, these methods require computation of the distances and weights at runtime to obtain the corrective blend shape. For a given animation (e.g. in a video game) these weights are often defined in advance based on the poses and baked into the model. Game engines apply the baked-in weights to the blend shapes. The sculpting process is typically done by an artist and then only for poses that will be used in the animation.

Learning Pose Models.

Allen et al. [2002] use this PSD approach but rather than hand-sculpt the corrections, learn them from registered 3D scans. Their work focuses primarily on modeling the torso and arms of individuals, rather than whole bodies of a population. They store deformations of key poses and interpolate between them. When at, or close to, a stored shape, these methods are effectively perfect. They do not tend to generalize well to new poses, requiring dense training data. It is not clear how many such shapes would be necessary to model the full range of articulated human pose. As the complexity of the model increases, so does the complexity of controlling all these shapes and how they interact.

To address this, Kry et al. [2002] learn a low-dimensional PCA basis for each joints deformations. Pose-dependent deformations are described in terms of the coefficients of the basis vectors. Kavan et al. [2009] use example meshes generated using a non-linear skinning method to construct linear approximations. James and Twigg [2005] combine the idea of learning the bones (non-rigid, affine bones) and skinning weights directly from registered meshes. For blend shapes, they use an approach similar to [Kry et al. 2002].

Another way to address the limitations of blend skinning is through multi-weight enveloping (MWE) [Wang and Phillips 2002]. Rather than weight each vertex by a weighted combination of the bone transformation matrices, MWE learns weights for the elements of these matrices. This increases the capacity of the model (more parameters). Like [James and Twigg 2005] they overparameterize the bone transformations to give more expressive power and then use PCA to remove unneeded degrees of freedom. Their experiments typically involve user interaction and current game engines do not support the MWE approach.

Merry et al. [2006] find MWE to be overparameterized, because it allows vertices to deform differently depending on rotation in the global coordinate system. Their Animation Space model reduces the parameterization at minimal loss of representational power, while also showing computational efficiency on par with LBS.

Mohr and Gleicher [2003] who learn an efficient linear and realistic model from example meshes propose another alternative. To deal with the problems of LBS, however, they introduce extra bones to capture effects like muscle bulging. These extra bones increase complexity, are non-physical, and are non-intuitive for artists. Our blend shapes are simpler, more intuitive, more practical, and offer greater realism. Similarly, Wang et al. [2007] introduce joints related to surface deformation. Their rotational regression approach uses deformation gradients, which then must be converted to a vertex representation.

Learning Pose and Shape Models.

The above methods focus on learning poseable single-shape models. What is needed, however, are realistic poseable models that cover the space of human shape variation. Early methods use PCA to characterize a space of human body shapes [Allen et al. 2003; Seo et al. 2003] but do not model how body shape changes with pose. The most successful class of models are based on SCAPE [Anguelov et al. 2005] and represent body shape and pose-dependent shape in terms of triangle deformations rather than vertex displacements [Chen et al. 2013; Freifeld and Black 2012; Hasler et al. 2009; Hirshberg et al. 2012; PonsMoll et al. 2015]. These methods learn statistical models of shape variation from training scans containing different body shapes and poses. Triangle deformations provide allow the composition of different transformations such as body shape variation, rigid part rotation, and pose-dependent deformation. Weber et al. [2007] present an approach that has properties of SCAPE but blends this with example shapes. These models are not consistent with existing animation software.

Hasler et al. [2010] learn two linear blend rigs: one for pose and one for body shape. To represent shape change, they introduce abstract bones that control the shape change of the vertices. Animating a character of a particular shape involves manipulating the shape and pose bones. They learn a base mesh and blend weights but not blend shapes. Consequently, the model lacks realism.

Allen et al. [2006] formulate a vertex-based model that has the expressive power of the triangle deformation models so that it can capture a whole range of natural shapes and poses. For a given base body shape, they define a standard LBS model with scattered/exemplar PSD to model pose deformations, using radial basis functions for scattered data interpolation, shape-dependent pose deformations, and a fixed set of carrying angles. Consequently training it is also complex and requires a good initialization. They greedily define key angles at which to represent corrective blend shapes and they hold these fixed across all body shapes. A given body shape is parameterized by the vertices of the rest pose, corrective blend shapes (at the key angles), and bone lengths; these comprise a character vector. Given different character vectors for different bodies, they learn a low-dimensional latent space that lets them generalize character vectors to new body shapes; they learn these parameters from data. However, they had limited data and difficulty with overfitting so they restricted their body shape PCA space. As a result, the model did not generalize well to new shapes and poses. Their model is complex, has few parameters, and is learned from much less data.

OBJECT OF THE INVENTION

It is therefore an object of the invention, to provide a method and a device for learning a model of the body automatically that is both realistic and compatible with existing graphics software. It is a further object of the invention to make the body model as standard as possible so that it can be widely used, while, at the same time, keeping the realism of deformation-based models learned from data.

A BRIEF DESCRIPTION OF THE INVENTION

These objects are achieved by a method and a device according to the independent claims. Advantageous embodiments are defined in the dependent claims. In particular, the invention comprises a Skinned Multi-Person Linear (SMPL) model of the human body that can realistically represent a wide range of human body shapes, can be posed with natural pose-dependent deformations, exhibits soft-tissue dynamics, is efficient to animate, and is compatible with existing rendering engines.

The invention provides a human body model that captures body shape and pose variation as well as, or better than, the best previous models while being compatible with existing graphics pipelines and software. To that end, the invention uses standard skinning equations, defines body shape and pose blend shapes that modify the base mesh. The pose blend shapes depend on the elements of body part rotation matrices. The model may be trained on thousands of aligned scans of different people in different poses. The form of the model makes it possible to learn the parameters from large amounts of data while directly minimizing vertex reconstruction error. In one embodiment of the invention, the rest template, joint regressor, body shape model, pose blend shapes, and dynamic blend shapes are learned. Using 4D registered meshes, SMPL may also be extended to model dynamic soft-tissue deformations as a function of poses over time using an autoregressive model. SMPL can be exported as an FBX file According to another embodiment of the invention, blend shapes may be learned to correct for the limitations of standard skinning. Different blend shapes for identity, pose, and soft-tissue dynamics may be additively combined with a rest template before being transformed by blend skinning.

The pose blend shapes may be formulated as a linear function of the pose, in particular as linear function of elements of the part rotation matrices. This formulation is different from previous methods [Allen et al. 2006; Merry et al. 2006; Wang and Phillips 2002] and makes training and animating with the blend shapes simple. Because the elements of rotation matrices are bounded, so are the resulting deformations, helping the invention model to generalize better.

The model admits an objective function that penalizes the per vertex disparities between registered meshes and our model, enabling training from data. To learn how people deform with pose, 1786 high-resolution 3D scans of different subjects may be used in a wide variety of poses. The template mesh is aligned to each scan to create a training set. The blend weights, pose-dependent blend shapes, the mean template shape (rest pose), and a regressor from shape to joint locations are optimized to minimize the vertex error of the model on the training set. This joint regressor predicts the location of the joints as a function of the body shape and is critical to animating realistic pose-dependent deformations for any body shape. All parameters are estimated automatically from the aligned scans.

Linear models of male and female body shape may be learned from the CAESAR dataset [Robinette et al. 2002] (approximately 2000 scans per gender) using principal component analysis (PCA). First, a template mesh is registered to each scan and the data is pose normalized, which is critical when learning a vertex-based shape model. The resulting principal components become body shape blend shapes.

The SMPL model may be extended to capture soft-tissue dynamics by adapting the Dyna model [Pons-Moll et al. 2015]. The resulting Dynamic-SMPL, or DMPL model, is trained from the same dataset of 4D meshes as Dyna. DMPL, however, is based on vertices instead of triangle deformations. Vertex errors are computed between SMPL and Dyna training meshes, transformed into the rest pose, and use PCA to reduce the dimensionality, producing dynamic blend shapes. A soft-tissue model is then trained based on angular velocities and accelerations of the parts and the history of dynamic deformations as in [Pons-Moll et al. 2015]. Since soft-tissue dynamics strongly depend on body shape, DMPL may be trained using bodies of varying body mass index and a model of dynamic deformations may be learned that depends of body shape. The surprising result is that, when BlendSCAPE and the inventive model are trained on exactly the same data, the vertex-based model is more accurate and significantly more efficient to render than the deformation based model. Also surprising is that a relatively small set of learned blend shapes do as good a job of correcting the errors of LBS as they do for DQBS.

Animating soft-tissue dynamics in a standard rendering engine only requires computing the dynamic linear blend shape coefficients from the sequence of poses. Side-by-side animations of Dyna and DMPL reveal that DMPL is more realistic. This extension of SMPL illustrates the generality of the inventive additive blend shape approach, shows how deformations can depend on body shape, and demonstrates how the approach provides a extensible foundation for modeling body shape.

SMPL models can be animated significantly faster than real time on a CPU using standard rendering engines. Consequently, the invention addresses an open problem in the field; it makes a realistic learned model accessible to animators. The inventive base template is designed with animation in mind; it has a low-polygon count, a simple vertex topology, clean quad structure, a standard rig, and reasonable face and hand detail (though the hands or face are not rigged here). Models according to the invention can be represented as an Autodesk Filmbox (FBX) file that can be imported into animation systems.

BRIEF DESCRIPTION OF THE FIGURES

Different embodiments of the invention are described in more detail, in relation to the drawing in which.

DETAILED EMBODIMENTS

Figure 1:
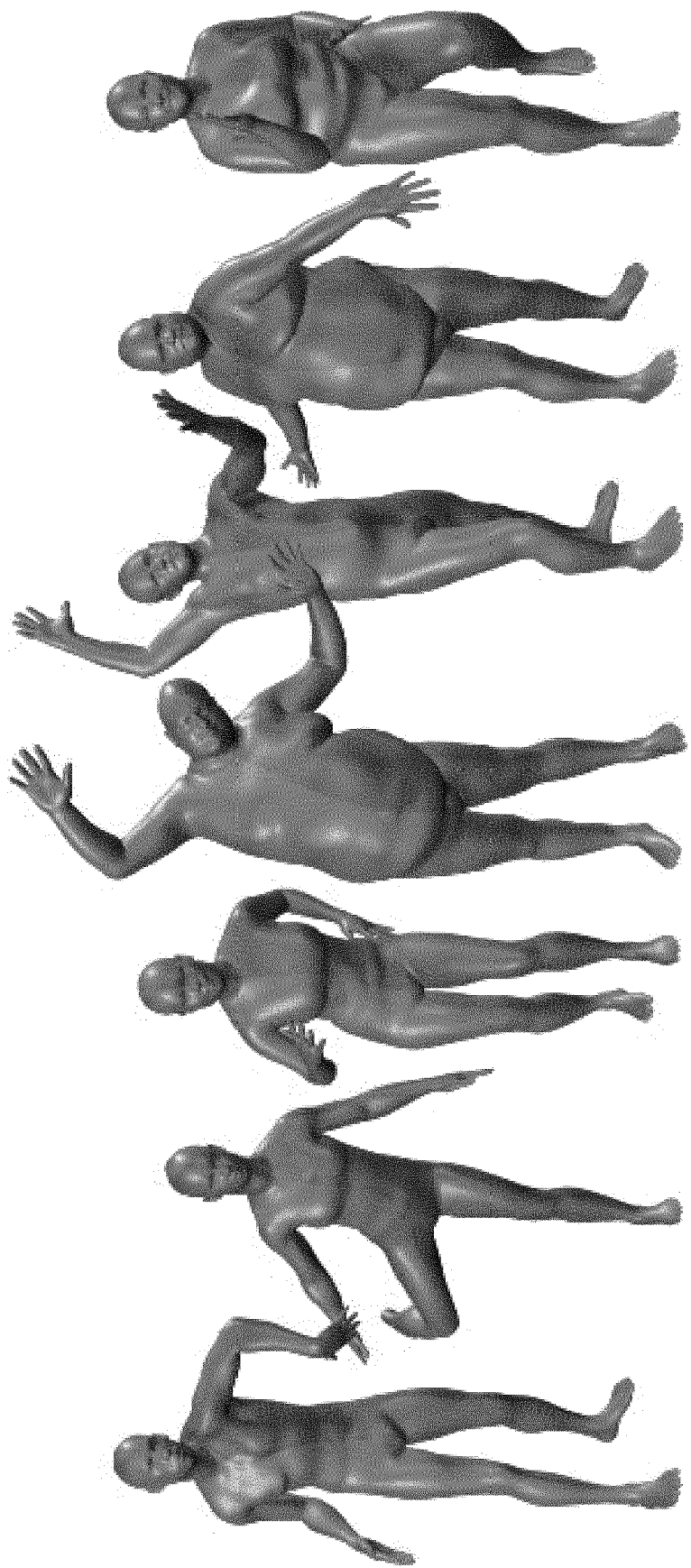
FIG. 1: (left) SMPL model (orange) fit to ground truth 3D meshes (gray). (right) Unity 5.0 game engine screenshot showing bodies from the CAESAR dataset animated in real time.
Figure 1A:

FIG. 1 shows a realistic learned model of human body shape and pose according to a first embodiment of the invention that is compatible with existing rendering engines and allows animator control using standard graphics tools. (left) SMPL model (orange) fit to ground truth 3D meshes (gray). (right) Unity 5.0 game engine screenshot showing bodies from the CAESAR dataset animated in real time.

Figure 2:
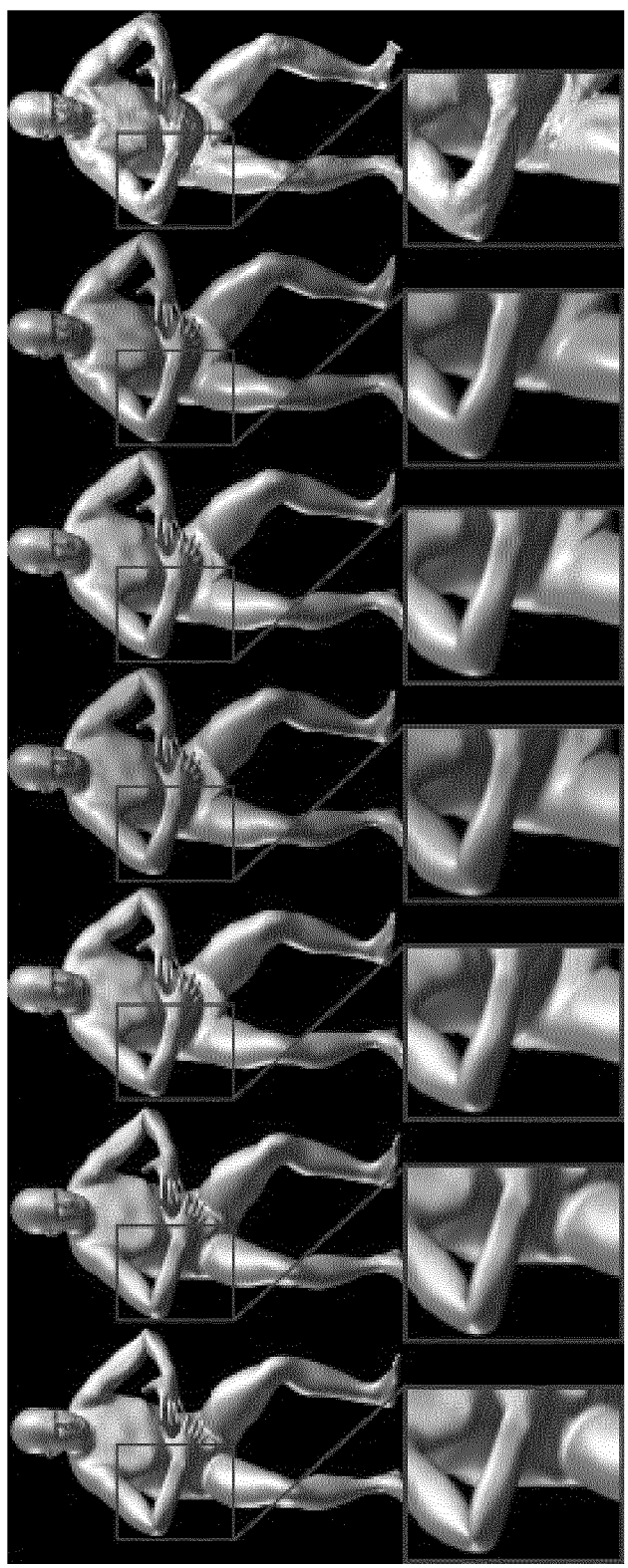
FIG. 2: shows models compared with ground truth. The far right (light gray) mesh is a 3D scan. Next to it (dark gray) is a registered mesh with the same topology as our model. We ask how well different models can approximate this registration. From left to right: (light green) Linear blend skinning (LBS), (dark green) Dualquaternion blend skinning (DQBS), (blue) BlendSCAPE, (red) SMPL-LBS, (orange) SMPL-DQBS. The zoomed regions highlight differences between the models at the subjects right elbow and hip. LBS and DQBS produce serious artifacts at the knees, elbows, shoulders and hips. BlendSCAPE and both SMPL models do similarly well at fitting the data.

FIG. 2 compares models with ground truth. More particularly, the inventive model is trained in various forms and compared quantitatively to a BlendSCAPE model [Hirshberg et al. 2012], trained with exactly the same data. The models are both evaluated qualitatively with animations and quantitatively using meshes that were not used for training. SMPL and BlendSCAPE are fit to these meshes and then the vertex errors are compared. Two main variants of SMPL are explored, one using linear blend skinning (LBS) and the other with Dual-Quaternion blend skinning (DQBS).

The far right (light gray) mesh is a 3D scan. Next to it (dark gray) is a registered mesh with the same topology as the inventive model. The comparison shows how well different models can approximate this registration. From left to right: (light green) Linear blend skinning (LBS), (dark green) Dual-Quaternion blend skinning (DQBS), (blue) BlendSCAPE, (red) SMPL-LBS, (orange) SMPL-DQBS. The zoomed regions highlight differences between the models at the subject's right elbow and hip. LBS and DQBS produce serious artifacts at the knees, elbows, shoulders and hips. BlendSCAPE and both SMPL models do similarly well at fitting the data.

Surprisingly, the vertex-based, skinned, model according to the invention is actually more accurate than a deformation-based model like BlendSCAPE trained on the same data.

Figure 3:
FIG. 3: shows a SMPL model according to an embodiment of the invention. (a) Template mesh with blend weights indicated by color and joints shown in white. (b) With identity-driven blendshape contribution only; vertex and joint locations are linear in shape vector $\vec{\beta}$. (c) With the addition of of pose blend shapes in preparation for the split pose; note the expansion of the hips. (d) Deformed vertices reposed by dual quaternion skinning for the split pose.
Figure 6:
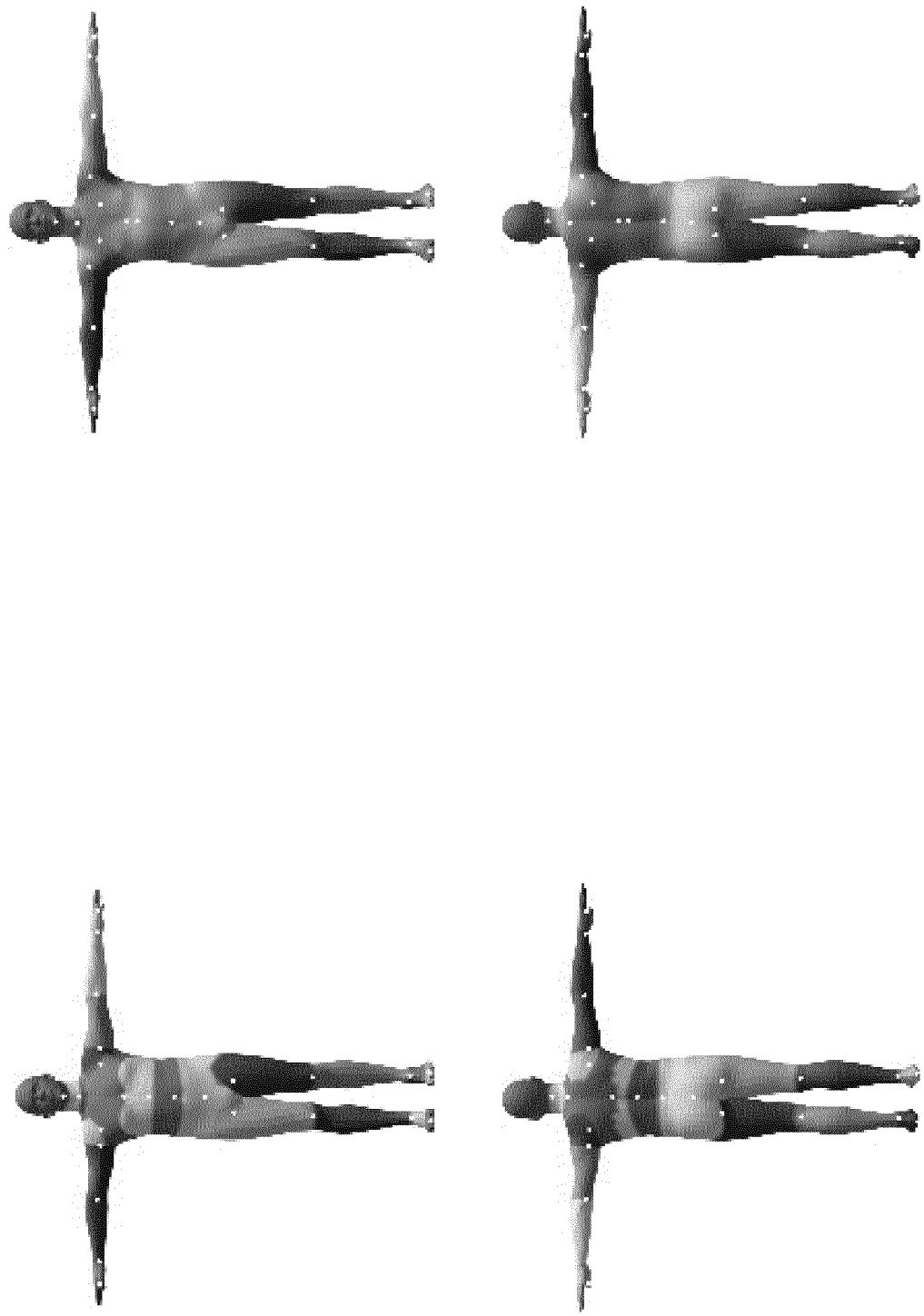
FIG. 6: shows initialization of joints and blend weights. Discrete part segmentation in (a) is diffused to obtain initial blend weights, $W_I$, in (b). Initial joint centers are shown as white dots.

FIG. 3 shows an illustration of the skinned multi-person linear model according to the invention. Like SCAPE, the SMPL model decomposes body shape into identity-dependent shape and non-rigid pose-dependent shape; unlike SCAPE, the invention takes a vertex-based skinning approach that uses corrective blend shapes. A single blend shape is represented as a vector of concatenated vertex offsets. The method begins with an artist created mesh with $N=6890$ vertices and $K=23$ joints. The mesh has the same topology for men and women, spatially varying resolution, a clean quad structure, a segmentation into parts, initial blend weights, and a skeletal rig. The part segmentation and initial blend weights are shown in FIG. 6.

Following standard skinning practice, the model is defined by a mean template shape represented by a vector of N concatenated vertices $\bar{T} \in \mathfrak{R}^{3N}$ in the zero pose, $\vec{\theta}^*$; a set of blend weights, $\mathcal{W} \in \mathfrak{R}^{N \times K}$, (FIG. 3(a)); a blend shape function, $B_S(\vec{\beta}): \mathfrak{R}^{|\vec{\beta}|} \mapsto \mathfrak{R}^{3N}$, that takes as input a vector of shape parameters, $\vec{\beta}$, (FIG. 3(b)) and outputs a blend shape sculpting the subject identity; a function to predict K joint locations (white dots in FIG. 3(b)), $J(\vec{\beta}): \mathfrak{R}^{|\vec{\beta}|} \mapsto \mathfrak{R}^{3K}$ as a function of shape parameters, $\vec{\beta}$; and a pose-dependent blend shape function, $B_p(\vec{\theta}): \mathfrak{R}^{|\vec{\theta}|} \mapsto \mathfrak{R}^{3N}$, that takes as input a vector of pose parameters, $\vec{\theta}$, and accounts for the effects of pose-dependent deformations (FIG. 3(c)). The corrective blend shapes of these functions are added together in the rest pose as illustrated in (FIG. 3(c)). Finally, a standard blend skinning function $W(\cdot)$ (linear or dual-quaternion) is applied to rotate the vertices around the estimated joint centers with smoothing defined by the blend weights. The result is a model, $M(\vec{\beta}, \vec{\theta}; \phi): \mathfrak{R}^{|\vec{\theta}| \times |\vec{\beta}|} \mapsto \mathfrak{R}^{3N}$, that maps shape and pose parameters to vertices (FIG. 3(d)). Here $\phi$ represents the learned model parameters described below.

Both LBS and DQBS skinning methods will be used below. In general the skinning method can be thought of as a generic black box. Given a particular skinning method our goal is to learn $\phi$ to correct for limitations of the method so as to model training meshes. Note that the learned pose blend shapes both correct errors caused by the blend skinning function and static soft-tissue deformations caused by changes in pose.

Blend Skinning.

To fix ideas and define notation, the LBS version is presented as it makes exposition clear (the DQBS version of SMPL only requires changing the skinning equation). Meshes and blend shapes are vectors of vertices represented by bold capital letters (e.g. X) and lowercase bold letters (e.g. $x_i \in \mathfrak{R}^3$) are vectors representing a particular vertex. The vertices are sometimes represented in homogeneous coordinates. The same notation is used for a vertex whether it is in standard or homogeneous coordinates as it should always be clear from the context which form is needed.

The pose of the body is defined by a standard skeletal rig, where $\vec{w}_k \in \mathfrak{R}^3$ denotes the axis-angle representation of the relative rotation of part k with respect to its parent in the kinematic tree. In the present embodiment, the rig has $K=23$ joints, hence a pose $\vec{\theta} = [\vec{w}_0^T, \ldots, \vec{w}_K^T]^T$ is defined by $|\vec{\theta}| = 3 \times 23 + 3 = 72$ parameters; i.e. 3 for each part plus 3 for the root orientation. Let $$\bar{w} = \frac{\vec{w}}{\|\vec{w}\|}$$

denote the unit norm axis of rotation. Then the axis angle for every joint j is transformed to a rotation matrix using the Rodrigues formula.

$$\exp(\vec{w}_j) = I + \hat{\bar{w}}_j \sin(\|\vec{w}_j\|) + \hat{\bar{w}}_j^2 (1 - \cos(\|\vec{w}_j\|)) \quad (1)$$

where $\hat{\bar{w}}$ is the skew symmetric matrix of the 3-vector $\bar{w}$ and I is the 3×3 identity matrix. Using this, the standard linear blend skinning function $W(\bar{T}, J, \vec{\theta}, W): \mathfrak{R}^{3N} \times 3K \times |\vec{\theta}| \times |W| \to \mathfrak{R}^{3N}$ takes vertices in the rest pose, $\bar{T}$, joint locations, $J$, a pose, $\vec{\theta}$; and the blend weights, $\omega$, and returns the posed vertices. Each vertex $\bar{t}_i$ in $\bar{T}$ is transformed into $\bar{t}_i'$ (both column vectors in homogeneous coordinates) as $$\bar{t}_i' = \sum_{k=1}^{K} w_{k,i} G'_k(\vec{\theta}, J) \bar{t}_i \quad (2)$$

$$G'_k(\vec{\theta}, J) = G_k(\vec{\theta}, J) G_k(\vec{\theta}^*, J)^{-1} \quad (3)$$

$$G_k(\vec{\theta}, J) = \prod_{j \in A(k)} \begin{bmatrix} \exp(\vec{w}_j) & j_j \\ \vec{0} & 1 \end{bmatrix} \quad (4)$$

where $w_{k,i}$ is an element of the blend weight matrix $W$, representing how much the rotation of part $k$ effects the vertex $i$, $\exp(\vec{\theta}_j)$ is the local 3×3 rotation matrix corresponding to joint $j$, $G'_k(\vec{\theta}, J)$ is the world transformation of joint $k$, and $G'_k(\vec{\theta}, J)$ is the same transformation after removing the transformation due to the rest pose, $\vec{\theta}^*$.

Each 3-element vector in J corresponding to a single joint center, j, is denoted $j_j$. Finally, A(k) denotes the ordered set of joint ancestors of joint k. Note, for compatibility with existing rendering engines, it is assumed that W is sparse and at most four parts are allowed to influence a vertex.

Many methods have modified equation (2) to make skinning more expressive. For example MWE [Wang and Phillips 2002] replaces $G_k(\vec{\theta}, J)$ with a more general affine transformation matrix and replaces the scalar weight with a separate weight for every element of the transformation matrix. Such changes are expressive but are not compatible with existing animation systems.

To maintain compatibility, the basic skinning function may be kept and instead the template may be modified in an additive way and a function is learned to predict joint locations. The model, $M(\vec{\beta}, \vec{\theta}; \phi)$ is then $$M(\vec{\beta}, \vec{\theta}) = W(T_P(\vec{\beta}, \vec{\theta}), J(\vec{\beta}), \vec{\theta}, W) \quad (5)$$

$$T_P(\vec{\beta}, \vec{\theta}) = \bar{T} + B_S(\vec{\beta}) + B_P(\vec{\theta}) \quad (6)$$

where $B_S(\vec{\beta})$ and $B_P(\vec{\theta})$ are vectors of vertices representing offsets from the template. These are referred to as shape and pose blend shapes respectively.

Given this definition, a vertex $\bar{t}_i$ is transformed according to $$\bar{t}_i' = \sum_{k=1}^{K} w_{k,i} G'_k(\vec{\theta}, J(\vec{\beta}))(\bar{t}_i + b_{S,i}(\vec{\beta}) + b_{P,i}(\vec{\theta})) \quad (7)$$

where $b_{S,i}(\vec{\beta})$, $b_{P,i}(\vec{\theta})$ are vertices in $B_S(\vec{\beta})$ and $B_P(\vec{\theta})$ respectively and represent the shape and pose blend shape offsets for the vertex $\bar{t}_i$. Hence, the joint centers are now a function of body shape and the template mesh that is deformed by blend skinning is now a function of both pose and shape.

Shape Blend Shapes.

The body shapes of different people are represented by a linear function $B_S$ $$B_S(\vec{\beta}; S) = \sum_{n=1}^{|\vec{\beta}|} \beta_n S_n \quad (8)$$

where $\vec{\beta} = [\beta_1, \ldots, \beta_{|\vec{\beta}|}]^T$, $|\vec{\beta}|$ is the number of linear shape coefficients, and the $S_n \in \mathfrak{R}^{3N}$ represent orthonormal principal components of shape displacements. Let $S = [S_1, \ldots, S_{|\vec{\beta}|}] \in \mathfrak{R}^{3N \times |\vec{\beta}|}$ be the matrix of all such shape displacements. Then the linear function $B_S(\vec{\beta}; S)$ is fully defined by the matrix S, which is learned from registered training meshes.

Notationally, the values to the right of a semicolon represent learned parameters, while those on the left are parameters set by an animator. For notational convenience, the learned parameters are often omitted when they are not explicitly being optimized in training.

FIG. 3(b) illustrates the application of these shape blend shapes to the template T to produce a new body shape.

Pose Blend Shapes.

R denotes: $R: \mathfrak{R}^{|\vec{\theta}|} \to \mathfrak{R}^{9K}$ a function that maps a pose vector $\vec{\theta}$ to a vector of concatenated part relative rotation matrices, $\exp(\vec{w})$. Given that the rig has 23 joints, $R(\vec{\theta})$ is a vector of length (23×9=207). Elements of $R(\vec{\theta})$ are functions of sines and cosines (Eq. (19)) of joint angles and therefore $R(\vec{\theta})$ is non-linear with $\vec{\theta}$.

This formulation differs from previous work in that the effect of the pose blend shapes is defined to be linear in $R^*(\vec{\theta}) = (R(\vec{\theta}) - R(\vec{\theta}^*))$, where $\vec{\theta}^*$ denotes the rest pose. Let $R_n(\vec{\theta})$ denote the $n_{th}$ element of $R(\vec{\theta})$, then the vertex deviations from the rest template are $$B_P(\vec{\theta}; P) = \sum_{n=1}^{9K} (R_n(\vec{\theta}) - R_n(\vec{\theta}^*)) P_n \quad (9)$$

where the blend shapes, $P_n \in \mathfrak{R}^{3N}$, are again vectors of vertex displacements. Here $P = [P_1, \ldots, P_{9K}] \in \mathfrak{R}^{3N \times 9K}$ is a matrix of all 207 pose blend shapes. In this way, the pose blend shape function $B_P(\vec{\theta}; P)$ is fully defined by the matrix P.

Subtracting the rest pose rotation vector $R(\vec{\theta}^*)$ guarantees that the contribution of the pose blend shapes is zero in the rest pose, which is important for animation.

Joint Locations.

Different body shapes have different joint locations. Each joint is represented by its 3D location in the rest pose. It is critical that these are accurate, otherwise there will be artifacts when the model is posed using the skinning equation. For that reason, the joints are defined as a function of the body shape, $\vec{\beta}$, $$J(\vec{\beta}, \mathfrak{I}, \overline{T}, S) = \mathfrak{I}(\overline{T} + B_S(\vec{\beta}; S)) \tag{10}$$

where $\mathfrak{I}$ is a matrix that transforms rest vertices into rest joints. The regression matrix, $\mathfrak{I}$, is learned from examples of different people in many poses. This matrix models which mesh vertices are important and how to combine them to estimate the joint locations.

SMPL Model.

One can now specify the full set of model parameters of the SMPL model as $\phi = \{\overline{T}, W, S, J, P\}$. Once learned they are held fixed and new body shapes and poses are created and animated by varying $\vec{\beta}$ and $\vec{\theta}$ respectively.

Then the SMPL model is finally defined as $M(\vec{\beta}, \vec{\theta}; \phi)=$ $$W(T_P(\vec{\beta}, \vec{\theta}, \overline{T}, S, P), J(\vec{\beta}; \mathfrak{I}, \overline{T}, S), \vec{\theta}, W) \tag{11}$$

and hence each vertex is transformed as $$t'_i = \sum_{k=1}^{K} w_{k,i} G'_k(\vec{\theta}, J(\vec{\beta}, \mathfrak{I}, \overline{T}, S)) t_{P,i}(\vec{\beta}, \vec{\theta}; \overline{T}, S, P) \text{ where} \tag{12}$$

$$t_{P,i}(\vec{\beta}, \vec{\theta}; \overline{T}, S, P) = \bar{t}_i + \sum_{m=1}^{|\vec{\beta}|} \beta_m s_{m,i} + \sum_{n=1}^{9K} (R_n(\vec{\theta}) - R_n(\vec{\theta}^*)) p_{n,i} \tag{13}$$

represents the vertex i after applying the blend shapes and where $s_{m,i}, p_{n,i} \in \mathfrak{R}^3$ are the elements of the shape and pose blend shapes corresponding to template vertex $\bar{t}_i$.

Below, experiments with both LBS and DQBS are described, wherein the parameters are trained for each. These models are referred to as SMPL-LBS and SMPL-DQBS; SMPL-DQBS is the default model, and SMPL is used as shorthand to mean SMPL-DQBS.

Training

Figure 4:
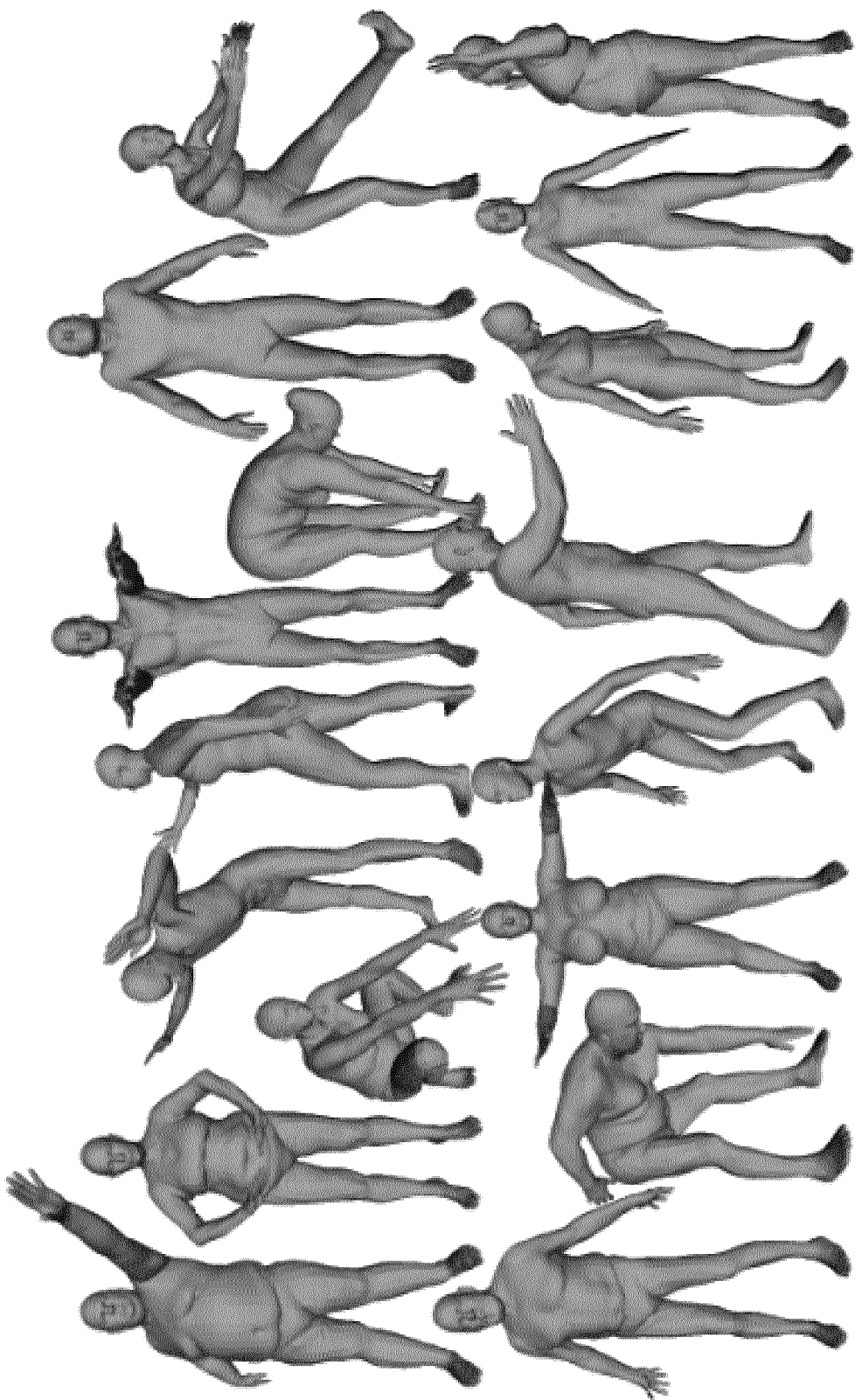
FIG. 4: shows sample registrations from the multipose dataset.
Figure 5:
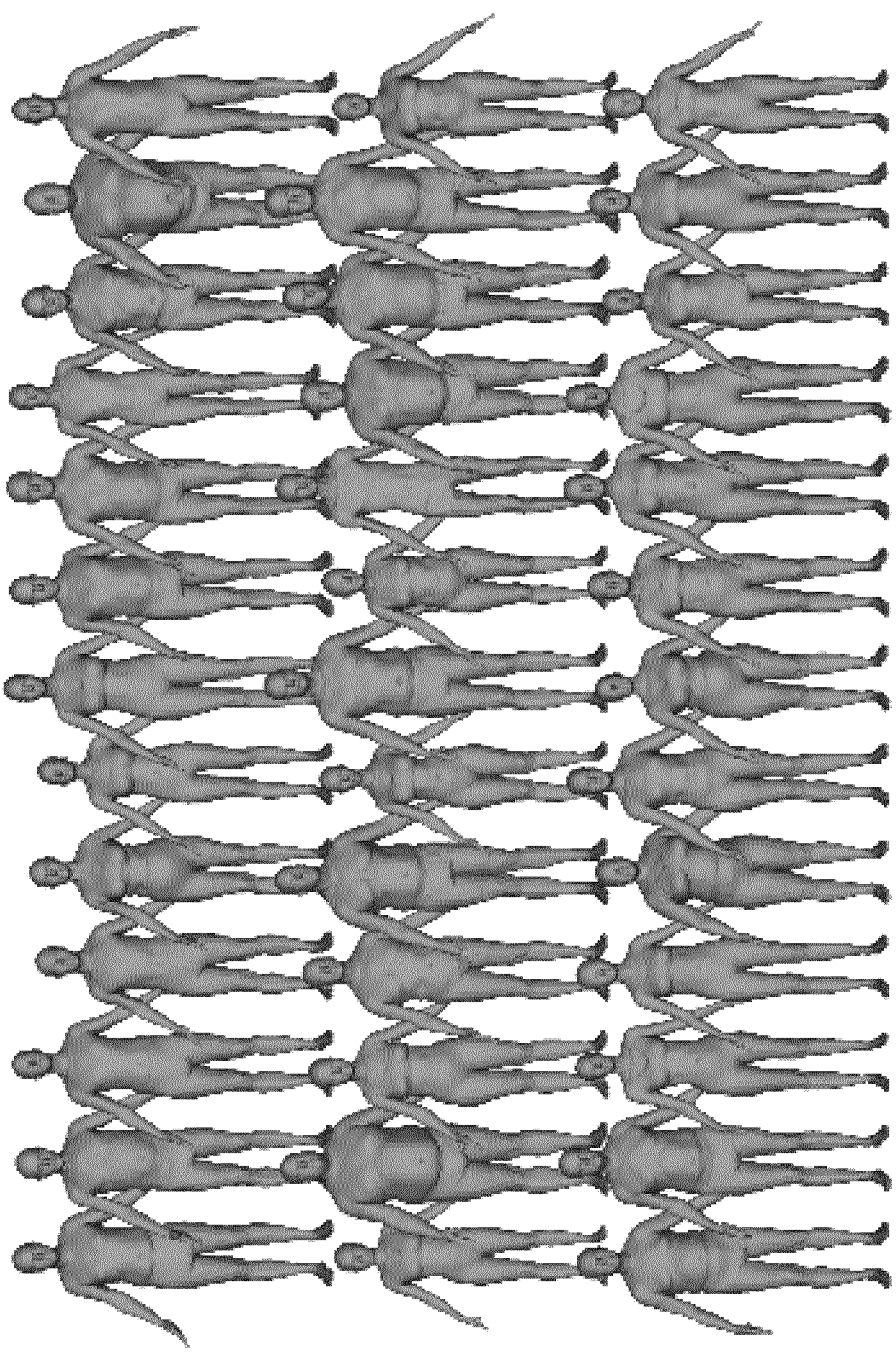
FIG. 5: shows sample registrations from the multishape dataset.

The SMPL model parameters are trained to minimize reconstruction error on two datasets. Each dataset contains meshes with the same topology as our template that have been aligned to high-resolution 3D scans using [Bogo et al. 2014]; these aligned meshes are called "registrations"; The multi-pose dataset consists of 1786 registrations of 40 individuals (891 registrations spanning 20 females, and 895 registrations spanning 20 males); a sampling is shown in FIG. 4. The multi-shape dataset consists of registrations to the CAESAR dataset [Robinette et al. 2002], totaling 1700 registrations for males and 2100 for females; a few examples are shown in FIG. 5. The $j^{th}$ mesh in the multi-pose dataset is denoted as $V_j^P$ and the $j^{th}$ mesh in the multi-shape dataset as $V_j^S$.

According to the invention, the parameters $\phi = \{\overline{T}, W, S, J, P\}$ are trained to minimize a vertex reconstruction error on the datasets. Because the model decomposes shape and pose, these are trained separately, simplifying optimization. First, $\{\mathfrak{I}, \omega, P\}$ is trained using a multi-pose dataset and then $\{T, S\}$ is trained using our multi-shape dataset. Separate models are trained for men and women (i.e. $\phi_m$ and $\phi_f$)

First, the multi-pose dataset is used to train $\{\mathfrak{I}, \omega, P\}$. To this end, one needs to compute the rest templates, $\hat{T}_i^P$, and joint locations, $\hat{J}_i^P$, for each subject, i, as well as the pose parameters, $\vec{\theta}_j$, for each registration, j, in the dataset. The alternates framing method between optimizing registration specific parameters $\vec{\theta}_j$, subject-specific parameters $\{\hat{T}_i^P, \hat{J}_i^P\}$, and global parameters $\{W, P\}$. Then the matrix, $\mathfrak{I}$, is learned to regress from subject-specific vertex locations, $\hat{T}_i^P$, to subject-specific joint locations, $\hat{J}_i^P$. To achieve all this, one minimizes an objective function consisting of a data term, $E_D$, and several regularization terms $\{E_J, E_Y, E_P, E_W\}$ defined below.

The data term penalizes the squared Euclidean distance between registration vertices and model vertices $$E_D(\hat{T}^P, \hat{J}^P, W, P, \Theta) = \sum_{j=1}^{P_{reg}} \|V_j^P - W(\hat{T}_{s(j)}^P + B_P(\vec{\theta}_j; P), \hat{J}_{s(j)}^P, \vec{\theta}_j, W)\|^2$$

where $\Theta = \{\vec{\theta}_1, \ldots, \vec{\theta}_{P_{reg}}\}$, s(j) is the subject index corresponding to registration j, $P_{reg}$ are the number of meshes in the pose trainings set, $$\hat{T}^P = \{\hat{T}_i^P\}_{i=1}^{P_{subj}}, \hat{J}^P = \{\hat{J}_i^P\}_{i=1}^{P_{subj}}$$

are the sets of all rest poses and joints, and $P_{subj}$ is the number of subjects in the pose training set.

The method estimates 207×3×6890=4,278,690 parameters for the pose blend shapes, P, 4×3×6890=82,680 parameters for the skinning weights, W, and 3×6890×23×3=1,426,230 for the joint regressor matrix, $\mathfrak{I}$. To make the estimation well behaved, we regularize by making several assumptions. A symmetry regularization term, $E_Y$, penalizes left-right asymmetry for $\hat{J}^P$ and $\hat{T}^P$.

$$E_Y(\hat{J}^P, \hat{T}^P) = \sum_{i=1}^{P_{subj}} \lambda_U \|\hat{J}_i^P - U(\hat{J}_i^P)\|^2 + \|\hat{T}_i^P - U(\hat{T}_i^P)\|^2$$

where $\lambda_U = 100$, and where U(T) finds a mirror image of vertices T, by flipping across the sagittal plane and swapping symmetric vertices. This term encourages symmetric template meshes and, more importantly, symmetric joint locations. Joints are unobserved variables and along the spine they are particularly difficult to localize. While models trained without the symmetry term produce reasonable results, enforcing symmetry produces models that are visually more intuitive for animation.

The model is hand segmented into 24 parts (FIG. 6). This segmentation is used to compute an initial estimate of the joint centers and a regressor $J_I$ from vertices to these centers. This regressor computes the initial joints by taking the average of the ring of vertices connecting two parts. When estimating the joints for each subject, they are regularized to be close to this initial prediction:

$$E_J(\hat{T}^P, \hat{J}^P) = \sum_{i=1}^{P_{subj}} \|\mathfrak{I}_I \hat{T}_i^P - \hat{J}_i^P\|^2$$

To help prevent overfitting of the pose-dependent blend shapes, they are regularized towards zero $$E_P(P) = \|P\|_F^2,$$

where $\|\cdot\|_F$ denotes the Frobenius norm. Replacing the quadratic penalty with an L1 penalty would encourage greater sparsity of the blend shapes.

The blend weights are also regularized towards the initial weights, $\omega_I$, shown in FIG. 6:

$$E_W(W) = \|W - W_I\|_F^2$$

The initial weights are computed by simply diffusing the segmentation.

Altogether, the energy for training $\{\omega, P\}$ is as follows:

$$E_*(\hat{T}^P, \hat{J}^P, \Theta, W, P) = E_D + \lambda_Y E_Y + \lambda_J E_J + \lambda_P E_P + E_W \quad (14)$$

where $\lambda_Y = 100$, $\lambda_J = 100$ and $\lambda_P = 25$. These weights were set empirically. The model has a large number of parameters and the regularization helps prevent overfitting. As the size of the training set grows, so does the strength of the data term, effectively reducing the influence of the regularization terms. The experiments below with held-out test data suggest that the learned models are not overfit to the data and generalize well.

Joint Regressor.

Figure 7:
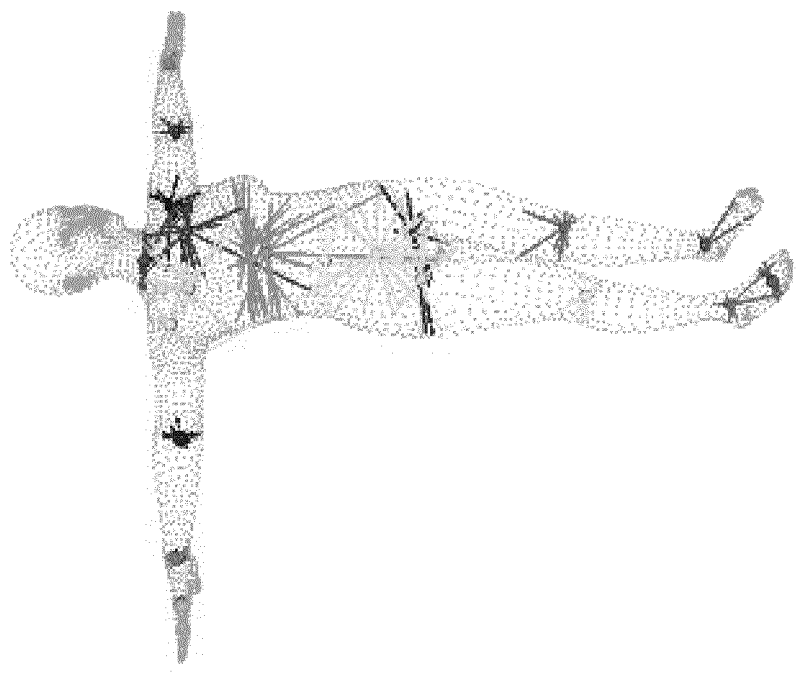
FIG. 7: shows a joint regression. (left) Initialization. Joint locations can be influenced by locations on the surface, indicated by the colored lines. It is assumed that these influences are somewhat local. (right) Optimized. After optimization a sparse set of vertices and associated weights influencing each joint are found.
Figure 7:
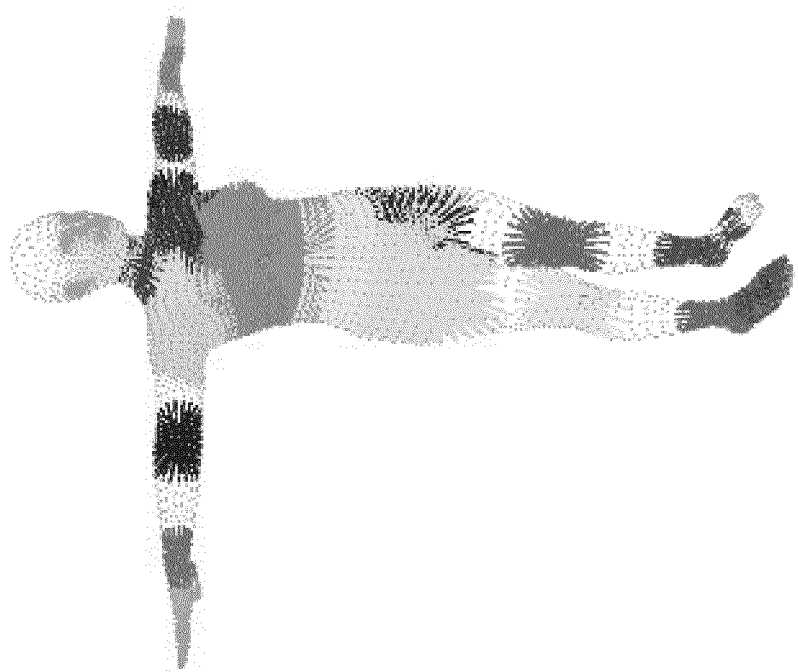

Optimizing the above gives a template mesh and joint locations for each subject, but one wants to predict joint locations for new subjects with new body shapes. To that end, the regressor matrix $\mathcal{J}$ is learned to predict the training joints from the training bodies. Several regression strategies were tried; what was found to work best, was to compute J using non-negative least squares [Lawson and Hanson 1995] with the inclusion of a term that encourages the weights to add to one. This approach encourages sparsity of the vertices used to predict the joints. Making weights positive and add to one discourages predicting joints outside the surface. These constraints enforce the predictions to be in the convex hull of surface points. FIG. 7 shows the non-zero elements of the regression matrix, illustrating that a sparse set of surface vertices are linearly combined to estimate the joint centers.

According to the invention, the shape space is defined by a mean and principal shape directions $\{\bar{T}, S\}$. It is computed by running PCA on shape registrations from our multi-shape database after pose normalization. Pose normalization transforms a raw registration $V_j^S$ into a registration, $\hat{T}_j^S$, in the rest pose, $\vec{\theta}*$. This normalization is critical to ensure that pose and shape are modeled separately.

To pose-normalize a registration, $V_j^S$, first its pose is estimated. $\hat{T}_\mu^P$ and $\hat{J}_\mu^P$ denote the mean shape and mean joint locations from the multi-pose database respectively. Let $W_e(\hat{T}_\mu^P, \hat{J}_\mu^P, \vec{\theta}, W), V_{j,e}^S \in \mathfrak{R}^3$ denote an edge of the model and of the registration respectively. An edge is obtained by subtracting a pair of neighboring vertices. To estimate the pose using an average generic shape $\hat{T}_\mu^P$, the following sum of squared edge differences is minimized so that $\vec{\theta}_j =$ $$\underset{\vec{\theta}}{\arg\min} \sum_e \|W_e(\hat{T}_\mu^P + B_P(\vec{\theta}; P), \hat{J}_\mu^P, \vec{\theta}, W) - V_{j,e}^S\|^2 \quad (15)$$

where the sum is taken over all edges in the mesh. This allows us to get a good estimate of the pose without knowing the subject specific shape.

Once the pose $\vec{\theta}_j$ is known we solve for $\hat{T}_j^S$ by minimizing $$\hat{T}_j^S = \underset{\hat{T}}{\arg\min} \|W(\hat{T} + B_P(\vec{\theta}_j; P), \mathcal{J}\hat{T}, \vec{\theta}_j, W) - V_j^S\|^2$$

This computes the shape that, when posed, matches the training registration. This shape is the pose-normalized shape.

We then run PCA on $$\{\hat{T}_j^S\}_{j=1}^{S_{subj}}$$

to obtain $\{T, S\}$. This procedure is designed to maximize the explained variance of vertex offsets in the rest pose, given a limited number of shape directions.

The optimization of pose is critically important when building a shape basis from vertices. Without this step, pose variations of the subjects in the shape training dataset would be captured in the shape blend shapes. The resulting model would not be decomposed properly into shape and pose. Note also that this approach contrasts with SCAPE or BlendSCAPE, where PCA is performed in the space of per-triangle deformations. Unlike vertices, triangle deformations do not live in a Euclidean space [Freifeld and Black 2012]. Hence PCA on vertices is more principled and is consistent with the registration data term, which consists of squared vertex disparities.

Figure 8:
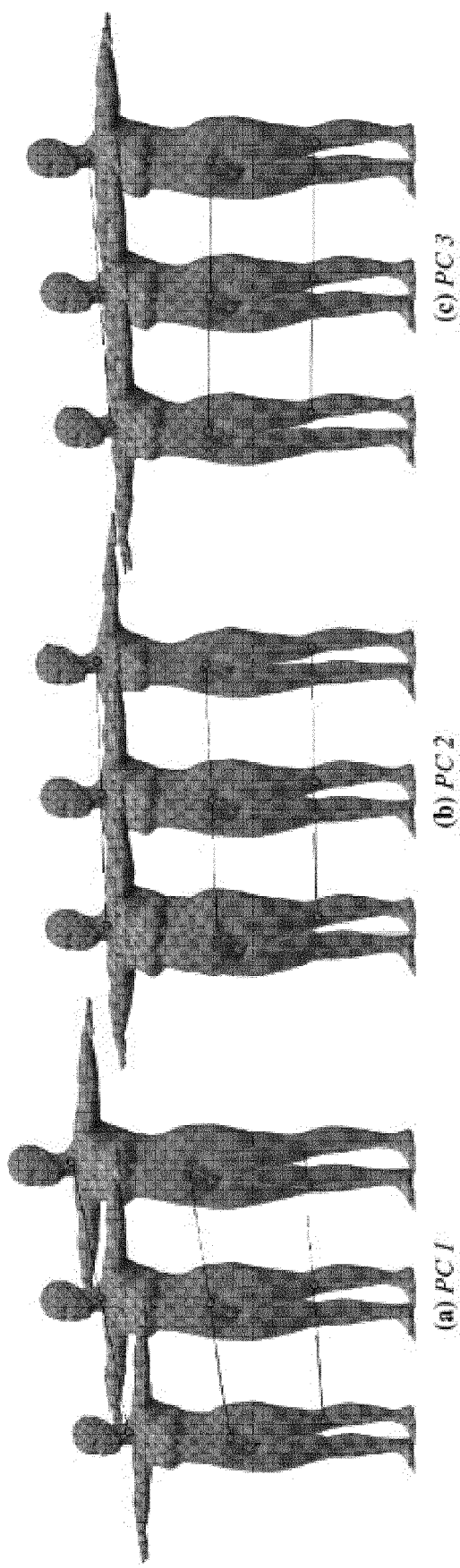
FIG. 8: shows shape blend shapes. The first three shape principal components of body shape are shown. PC1 and PC2 vary from −2 to +2 standard deviations from left to right, while PC3 varies from −5 to +5 standard deviations to make the shape variation more visible. Joint locations (red dots) vary as a function of body shape and are predicted using the learned regressor, J.

FIG. 8 visualizes the first three shape components. The figure also shows how the joint locations change with the changes in body shape. The joint positions are shown by the spheres and are computed from the surface meshes using the learned joint regression function. The lines connecting the joints across the standard deviations illustrate how the joint positions vary linearly with shape.

Figure 9:
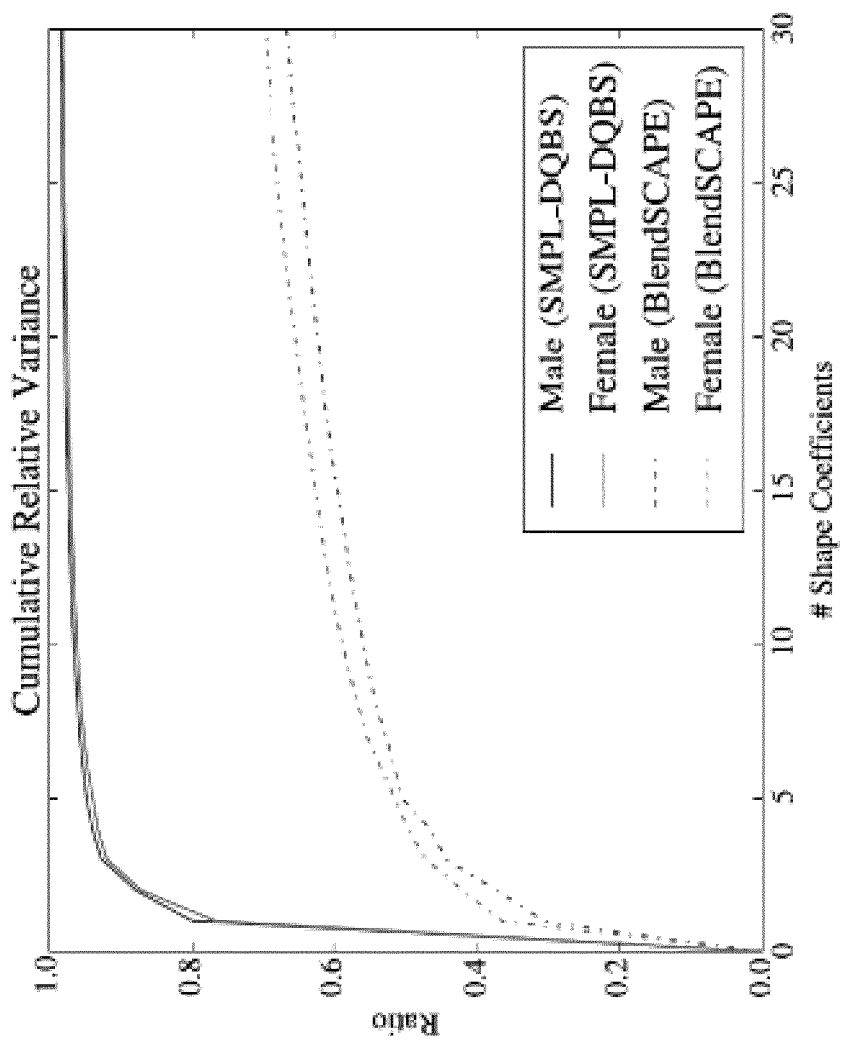
FIG. 9: shows a cumulative relative variance of the CAESAR dataset explained as a function of the number of shape coefficients. For SMPL the variance is in vertex locations, while for BlendSCAPE it is in triangle deformations.

FIG. 9 shows the relative cumulative variance of SMPL and BlendSCAPE. While SMPL requires many fewer PCs to account for the same percentage of overall variance, the variance is different in the two cases: one is variance in vertex locations and the other is variance in triangle deformations. Explained variance in deformations does not directly translate into explained variance in vertex locations. While this makes the two models difficult to compare precisely, triangle deformations have many more degrees of freedom and it is likely that there are many deformations that produce visually similar shapes. A model requiring fewer components is generally preferable.

Pose parameters $\vec{\theta}_j$ in Eq. (14) are first initialized by minimizing the difference between the model and the registration edges, similar to Eq. (15) using an average template shape. Then $\{\hat{T}^P, \hat{J}^P, W, P, \Theta\}$ are estimated in an alternating manner to minimize Eq. 14. We proceed to estimate J from $\{\hat{J}^P, \hat{T}^P\}$. We then run PCA on pose normalized subjects $$\{\hat{T}_j^S\}_{j=1}^{S_{subj}}$$

to obtain $\{T, S\}$. The final model is defined by $\{J, W, P, T, S\}$. Note that all training parameters except for $\{T, S\}$ are found with gradient-based dogleg minimization [Nocedal and Wright 2006]. Gradients are computed with automatic differentiation using the the Chumpy framework [Loper and Black 2014].

Evaluation

Figure 10:
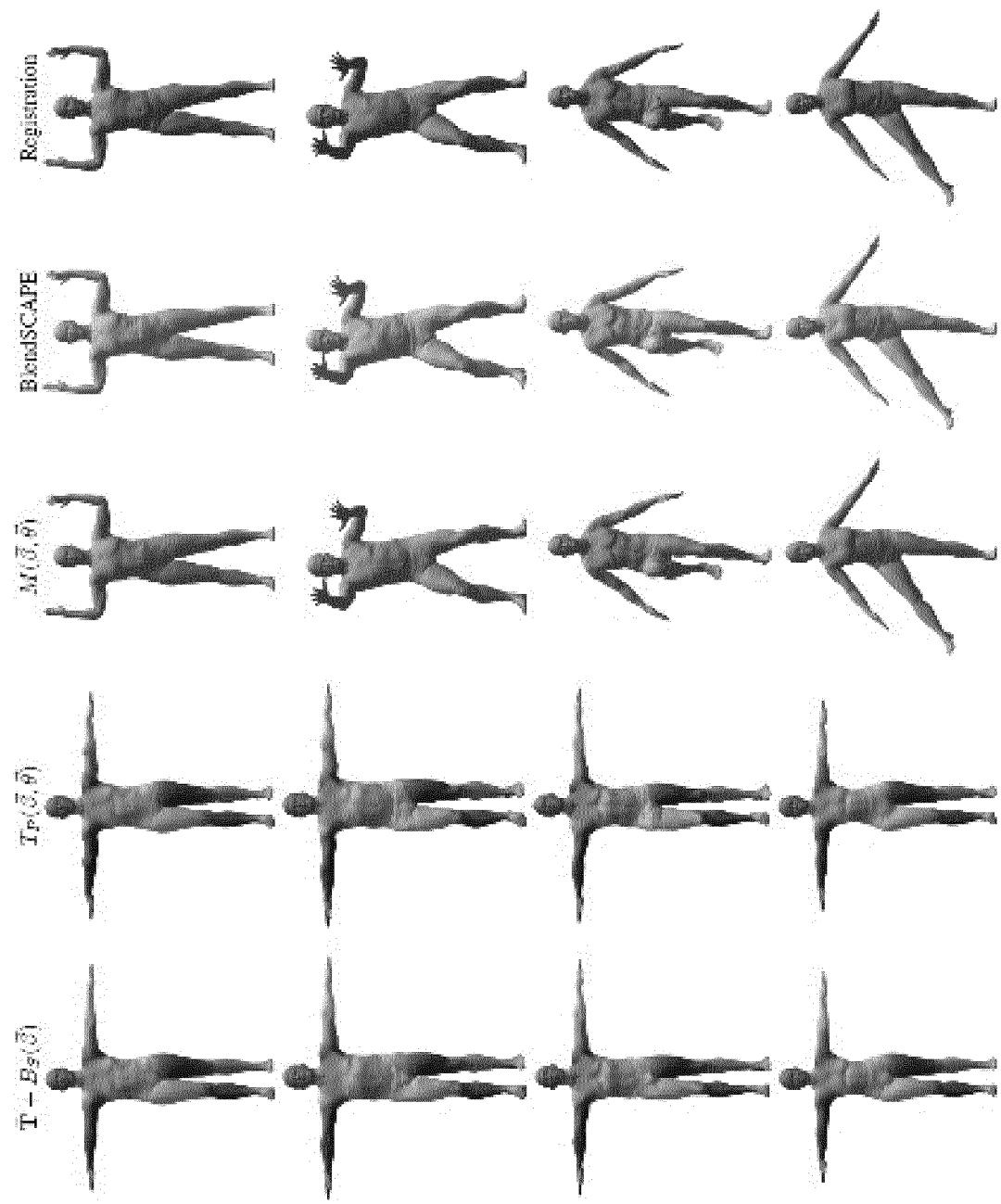
FIG. 10: shows a model fitting with intermediate stages. We fit both BlendSCAPE (blue) and SMPL-LBS, $M(\vec{\beta}, \vec{\theta})$, (red) to registered meshes by optimizing pose and shape. $\bar{T}+B_S(\vec{\beta})$, shows the estimated body shape and $T_P(\vec{\beta}, \vec{\theta})$ shows the effects of pose-dependent blend shapes. Here we show SMPL-LBS, because TP shows more variation due to pose than SMPL-DQBS.

Two types of error are evaluated. Model generalization is the ability of the model to fit to meshes of new people and poses; this tests both shape and pose blend shapes. Pose generalization is the ability to generalize a shape of an individual to new poses of the same person; this primarily tests how well pose blend shapes correct skinning artifacts and pose-dependent deformations. Both are measured by mean absolute vertex-to-vertex distance between the model and test registrations. For this evaluation we use 120 registered meshes of four women and two men from the public Dyna dataset [Dyn 2015]. These meshes contain a variety of body shapes and poses. All meshes are in alignment with our template and none were used to train our models. FIG. 10 (gray) shows four examples of these registered meshes.

SMPL-LBS and SMPL-DQBS are evaluated and compared with a BlendSCAPE model [Hirshberg et al. 2012] trained from exactly the same data as the SMPL models. The kinematic tree structure for SMPL and the BlendSCAPE model are the same: therefore the same number of pose parameters is used. The models are also compared using the same number of shape parameters.

To measure model generalization each model is first fit to each registered mesh, optimizing over shape $\vec{\beta}$ and pose $\vec{\theta}$ to find the best fit in terms of squared vertex distances. FIG. 10 shows fits of the SMPL-LBS (red) and BlendSCAPE (blue) models to the registered meshes. Both do a good job of fitting the data. The figure also shows how the model works. Illustrated are the estimated body shape, $T+B_S(\vec{\beta})$ and the effect of applying the pose blend shapes, $T_P(\vec{\beta}, \vec{\theta})$.

For pose generalization, for each individual, one of the estimated body shapes from the generalization task is selected, and then the pose, $\vec{\theta}$ is optimal for each of the other meshes of that subject, keeping the body shape fixed. The assumption behind pose generalization is that, if a model is properly decomposed into pose and shape, then the model should be able to fit the same subject in a different pose, without readjusting shape parameters. The pose blend shapes are trained to fit observed registrations. As such, they correct for problems of blend skinning and try to capture pose-dependent deformations. Since the pose blend shapes are not dependent on body shape, they capture something about the average deformations in the training set.

Figure 12:
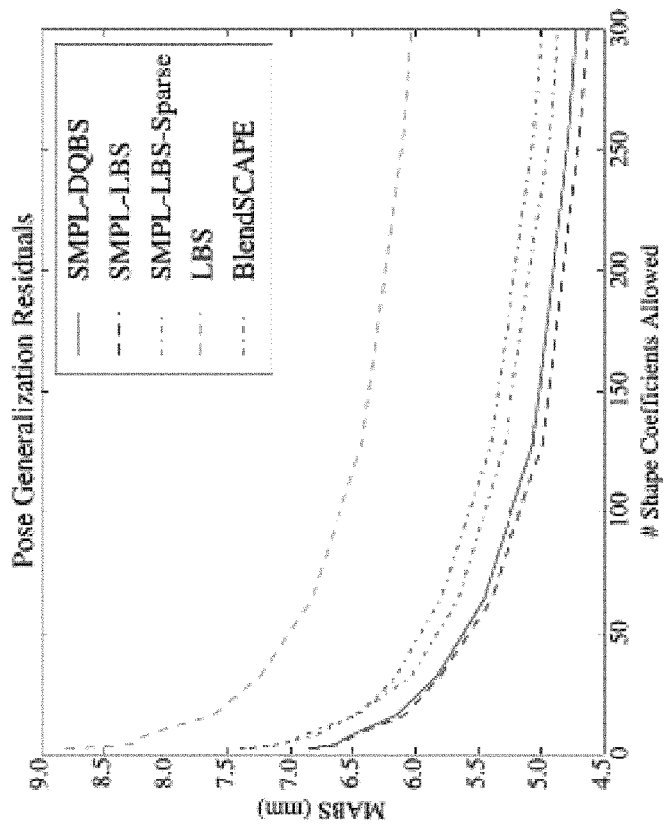
FIG. 12: Pose generalization error indicates how well a fitted shape generalizes to new poses.
Figure 11:
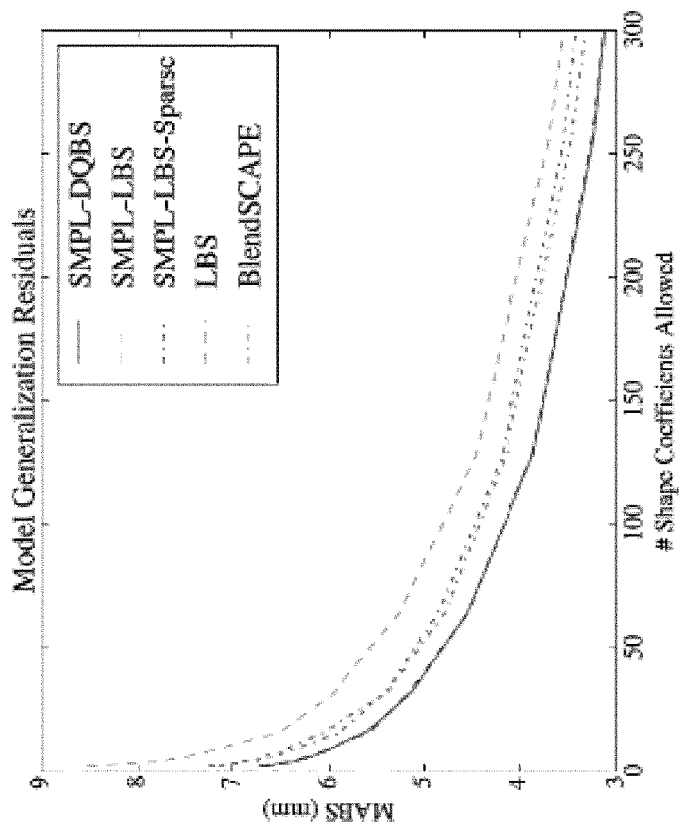
FIG. 11: Model generalization indicates how well one can fit an independent registration. Mean absolute vertex error versus the number of shape coefficients used.

FIGS. 11 and 12 show the error of the SMPL models and BlendSCAPE as a function of the number of body shape coefficients used. The differences between SMPL and BlendSCAPE are small (on the order of 0.5 mm) but SMPL is more accurate on average. Remarkably, SMPL-LBS and SMPL-DQBS are essentially identical in model generalization and SMPL-LBS is actually slightly better at pose generalization. This is surprising because the pose blend shapes have much more to correct with LBS. Possibly the simplicity of LBS helps with generalization to new poses.

This analysis is important because it says that users can choose the simpler and faster LBS model over the DQBS model.

The plots also show how well standard LBS fits the test data. This corresponds to the SMPL-LBS model with no pose blend shapes. Not surprisingly, LBS produces much higher error than either BlendSCAPE or SMPL. LBS is not as bad in FIG. 11 because here the model can vary body shape parameters, effectively using changes in identity to try to explain deformations due to pose. FIG. 12 uses a fixed body shape and consequently illustrates how LBS does not model pose-dependent deformations realistically. Note that here one does not retrain a model specifically for LBS and expect such a model would be marginally more accurate.

The pose blend shapes in SMPL are not sparse in the sense that a rotation of a part can influence any vertex of the mesh. With sufficient training data sparsity may emerge from data; e.g. the shoulder corrections will not be influenced by ankle motions. To make hand animation more intuitive, and to regularize the model to prevent long-range influences of joints, one can manually enforce sparsity. To this end, one may train a sparse version of SMPL by using the same sparsity pattern used for blend weights. In particular, a vertex deviation is allowed to be influenced by at most 4 joints. Since every joint corresponds to a rotation matrix, the pose blend shape corresponding to any given vertex will be driven by 9×4 numbers as opposed to 9×23.

This model is referred to as SMPL-LBS-Sparse in FIGS. 11 and 12. It is consistently less accurate than the regular SMPL-LBS model but may still be useful to animators. This suggests that SMPL-LBS is not overfit to the training data and that sparseness reduces the capacity of the model. The sparse model sometimes produces slight discontinuities at boundaries were vertices are influenced by different joint angles. Other strategies to enforce sparsity could be adopted, such as using an L1 prior or enforcing smoothness in the pose blend shapes. These approaches, however, complicate the training process.

Figure 13:
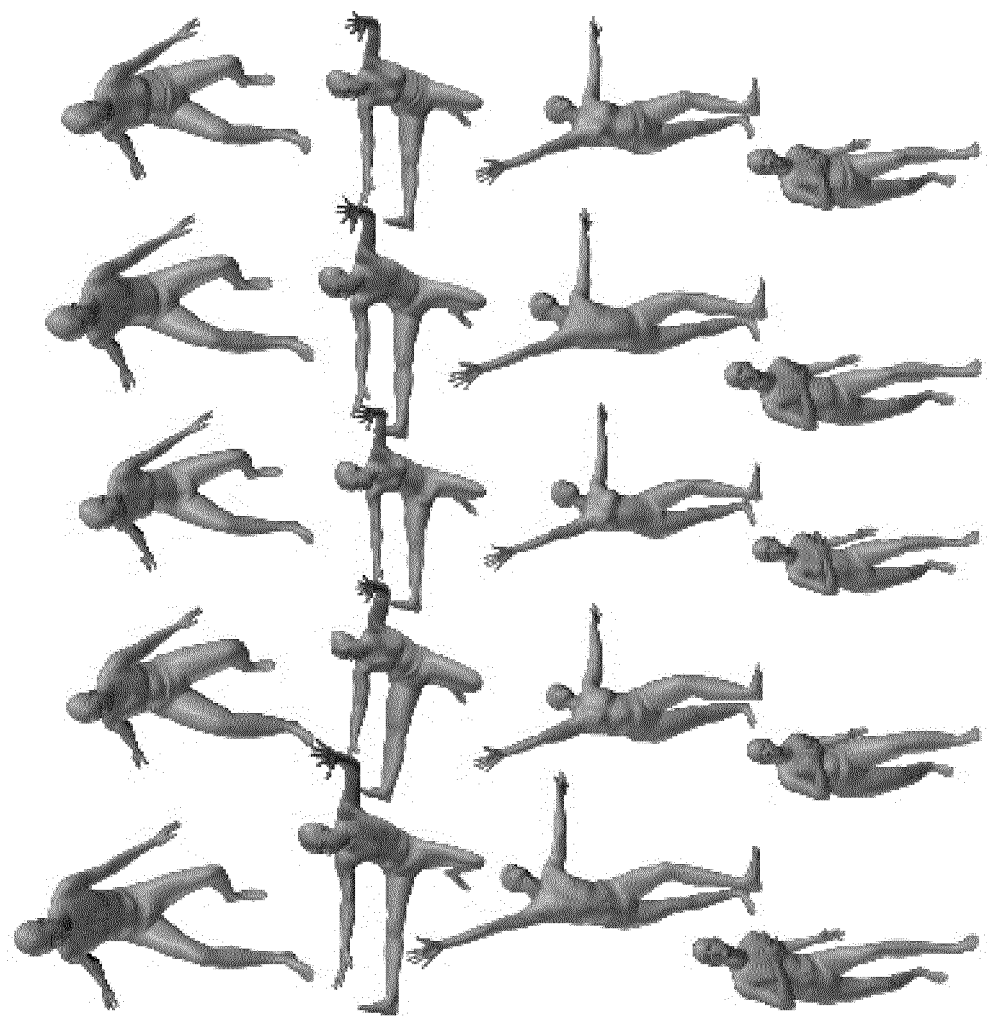
FIG. 13: shows animating SMPL. Decomposition of SMPL parameters into pose and shape: Shape parameters, $\vec{\beta}$, vary across different subjects from left to right, while pose parameters, $\vec{\theta}$ vary from top to bottom for each subject.

FIG. 13 illustrates the decomposition of shape parameters $\vec{\beta}$ and pose parameters $\vec{\theta}$ in SMPL. Pose is held constant from left to right across each row while varying the shape. Similarly, the shape of each person is held constant while varying the pose from top to bottom in each column. The bodies are reposed using poses from the CMU mocap database [CMU 2000]. The pose-dependent deformations look natural through a wide range of poses, despite very different body shapes. This illustrates that the joint regression works well and that the blend shapes are general.

Figure 14:
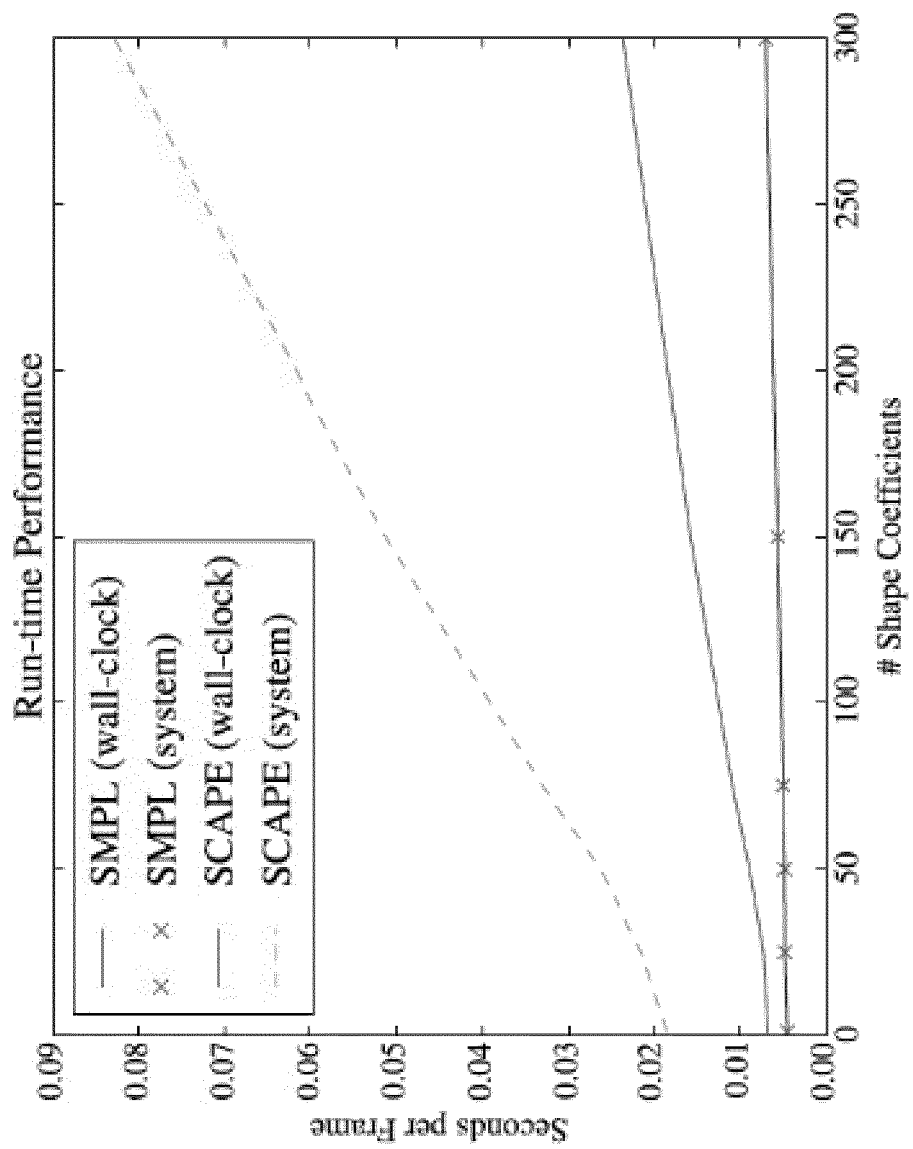
FIG. 14: shows how performance of SMPL and Blend-SCAPE vary with the number of body shape coefficients used. Performance shown here is from a 2014 Macbook Pro.

The run-time cost of SMPL is dominated by skinning and blendshape multiplication. Performance of a CPU based implementation of the invention model, and a comparison against BlendSCAPE, is shown in FIG. 14. The plot shows the time needed to generate the vertices. The BlendSCAPE rendering makes use of multiple cores, while the SMPL rendering does not; this is why the system time for BlendSCAPE is higher than the wall-clock time. Shown is the cost of changing body shape. For most applications, this is done once and the shape is then held fixed. The cost of animating the mesh then comes from only the pose blend shapes; this cost corresponds to o shape coefficients.

For meshes with the same number of vertices, SCAPE will always be slower. In SMPL each blend shape is of size 3 N, requiring that many multiplications per shape. SCAPE uses triangle deformations with 9 elements per triangle and there are roughly twice as many triangles as vertices. This results in roughly a factor of 6 difference between SMPL and SCAPE in terms of basic multiplications.

Compatibility with Rendering Engines

Because SMPL is built on standard skinning, it is compatible with existing 3D animation software. In particular, for a given body shape, one may generate the subject-specific rest-pose template mesh and skeleton (estimated joint locations) and export SMPL as a rigged model with pose blend shapes in Autodesk's Filmbox (FBX) file format, giving cross-platform compatibility. The model loads as a typical rigged mesh and can be animated as usual in standard 3D animation software.

Pose blend weights can be precomputed, baked into the model, and exported as an animated FBX file. This kind of file can be loaded into animation packages and played directly. The animated FBX files were tested in Maya, Unity, and Blender.

Pose blend weights can also be computed on the fly given the pose, $\vec{\theta}_t$, at time t. To enable this, scripts may be provided that take the joint angles and compute the pose blend weights. Loading and animating SMPL was tested in Maya 2013, 2014 and 2015. The animator can animate the model using any of the conventional animation methods typically used in Maya. The pose blend shape values can be viewed and/or edited manually within Maya if desired. SMPL was also tested in Unity. In SMPL, the blend weights range from −1 to +1 while in Unity they range form 0 to 1. Consequently, the weights are scaled and recentered for compatibility. For Unity, each blend shapes can be split into two—one positive and one negative. If the SMPL blend shape should be positive, then a script tells unity that the negative blend shape has zero weight (and vice versa for negative values). To speed computation for real-time graphics, blend shape weights that are close to zero can be set to zero and not used.

DMPL: Dynamic SMPL

While SMPL models static soft-tissue deformations with pose it does not model dynamic deformations that occur due to body movement and impact forces with the ground. Given 4D registrations that contain soft-tissue dynamics, we fit them by optimizing only the pose of a SMPL model with a personalized template shape. Displacements between SMPL and the observed meshes correspond to dynamic soft-tissue motions. To model these, a further embodiment of the invention introduces a new set of additive blend shapes called dynamic blend shapes. These additional displacements are correlated with velocities and accelerations of the body and limbs rather than with pose.

Let $\vec{\phi}_t = [\vec{\theta}_t, \vec{\theta}_t, v_t, a_t, \vec{\delta}_{t-1}, \vec{\delta}_{t-2}]$ denote the dynamic control vector at time t. It is composed of pose velocities and accelerations $\dot{\theta}_t, \ddot{\theta}_t \in \Re^{|\theta|}$, root joint velocities and accelerations $v_t, a_t \in \Re^3$ and a history of two vectors of predicted dynamic coefficients $\vec{\delta}_{t-1}, \vec{\delta}_{t-2} \in \Re^{|\delta|}$, describes below.

Figure 15:
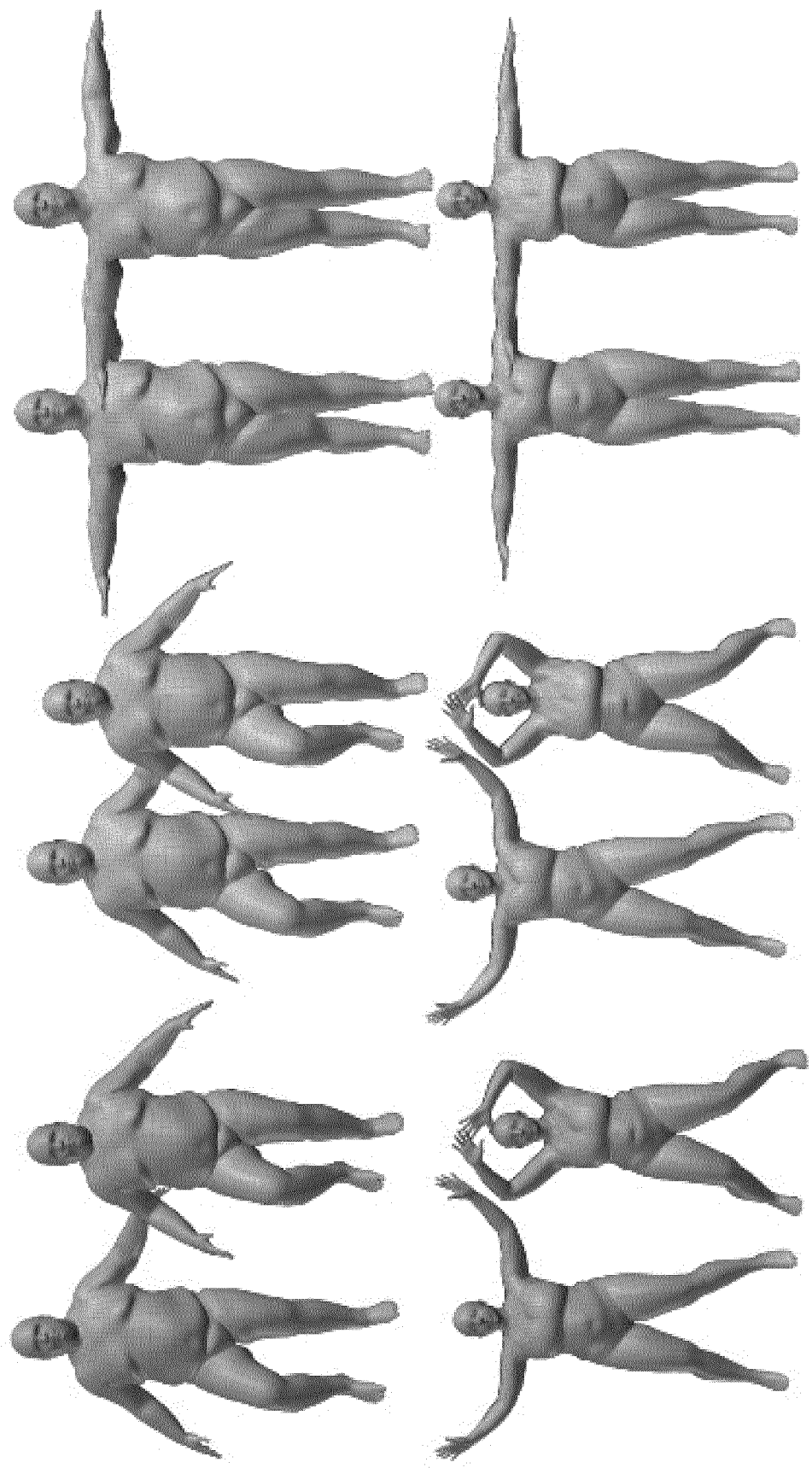
FIG. 15: shows DMPL model of soft-tissue motion according to an embodiment of the invention. Above, two frames of a "running" sequence of a male subject from the Dyna dataset, below two frames of a jumping jacks sequence of a female subject from the Dyna dataset. From left to right: SMPL, DMPL, and the dynamic blend shapes added to the base body shape. While SMPL models deformations due to pose well it does not model dynamic deformations. DMPL predicts dynamic deformations from motion and body shape, resulting in more life like animations.

The previous linear formulation is extended by adding the dynamic blend shape function, $B_D(\vec{\phi}_t, \vec{\beta})$, to the other blend shapes in the rest pose before applying the skinning function. The shape in the zero pose becomes $$T_D(\vec{\beta}, \vec{\theta}_t, \vec{\phi}_t) = T + B_S(\vec{\beta}) + B_P(\vec{\theta}_t) + B_D(\vec{\phi}_t, \vec{\beta}) \qquad (16)$$

as illustrated in FIG. 15. Here, $B_D(\vec{\phi}_t, \vec{\beta})$ takes as input the dynamic control vector at time t, and shape coefficients $\vec{\beta}$, and predicts vertex offsets in the rest pose.

Whereas in [Pons-Moll et al. 2015] dynamic deformations are modeled using triangle deformations, DMPL models deformations in vertex space. The method according to the present embodiment of the invention build male and female models using roughly 40,000 registered male and female meshes from [Dyn 2015]. The pose in each frame and the displacements between SMPL and the registration are computed. Using PCA, one obtains a mean and the dynamic blend shapes, $\mu_D \in \Re^{3N}$ and $D \in \Re^{3N \times |\delta|}$ respectively. We take $|\vec{\delta}|=300$ principal components as in Dyna. Dynamic deformations vary significantly between subjects based on their body shape and fat distribution. To capture this, we train a model that depends on the body shape parameters $\vec{\beta}$ as in Dyna.

Dynamic blend shapes are then predicted using $$B_D(\vec{\phi}_t, \vec{\beta}; D) = \mu_D + Df(\vec{\phi}_t, \vec{\beta}) \qquad (17)$$

analogous to Eq. (22) in [Pons-Moll et al. 2015] where $f(\cdot)$ is a function that takes as input a dynamic control vector, $\vec{\phi}_t$, and predicts the vector of dynamic shape coefficients, $\vec{\delta}_t$. This formulation of soft-tissue displacements in terms of dynamic blend shapes means that, unlike Dyna, this inventive model remains compatible with current graphics software. To animate the model, one only needs a script to compute the coefficients, $\vec{\delta}_t = f(\vec{\phi}_t, \vec{\beta})$, from the pose sequence and body shape. The DMPL model produces soft-tissue dynamics that appear more realistic than those of Dyna.

Discussion

Importantly, the pose training data spans a range of body shapes enabling to learn a good predictor of joint locations. Second, training all the parameters (template shape, blend weights, joint regressor, shape/pose/dynamic blend shapes) to minimize vertex reconstruction error is important to obtain a good model. Here the simplicity of the model is an advantage as it enables training everything with large amounts of data.

In contrast to the scattered-data interpolation methods, the blend shapes are learned from a large set of training meshes covering the space of possible poses and learn a simpler function relating pose to blend-shape weights. In particular, the inventive function is linear in the elements of the part rotation matrices. The larger support of the learned linear functions as opposed to radial basis functions allows the model to generalize to arbitrary poses; in addition the simple linear form makes it fast to animate in a game engine without baking in the weights. Because elements of a rotation matrix are constrained, the model cannot "blow up"; when generalizing outside the training set.

SMPL is an additive model in vertex space. In contrast, while SCAPE also factors deformations into shape and pose deformations, SCAPE multiplies the triangle deformations. With SCAPE a bigger person will have bigger pose-dependent deformations even though these deformations are not learned for different body shapes. Despite this, the experiments show that, the SCAPE approach is less accurate at generalizing to new shapes. Ideally one would have enough pose data from enough different people to learn a true body-shape dependent pose deformation space. DMPL, where deformations depend on body shape, shows that this is possible.

Models based on the statistics of triangle deformations have dominated the recent literature [Anguelov et al. 2005; Chen et al. 2013; Freifeld and Black 2012; Hasler et al. 2009]. Such models are not trained to reproduce their training registrations directly. Instead, they are trained to reproduce the local deformations that produced those registrations. Part of the tractability of training these models comes from the ability to train deformations independently across triangles. As a result, long range distances and relationships between vertices are not preserved as well as local relationships between vertices. An advantage of vertex based models (such as SMPL and [Allen et al. 2006]) is that they can be trained to minimize the mean squared error between the model and training vertices. One could train a SCAPE model to minimize vertex error in global coordinates, but the inner loop of the optimization would involve solving a least-squares problem to reconstruct vertices from the deformations. This would significantly increase the cost of optimization and make it difficult to train the model with large amounts of data.

The key to SMPL's performance is to make the blend shapes a linear function of the elements of $R^*(\vec{\theta})$. This formulation, sufficient training data, and a good optimization strategy make it possible to learn the model.

Figure 16:
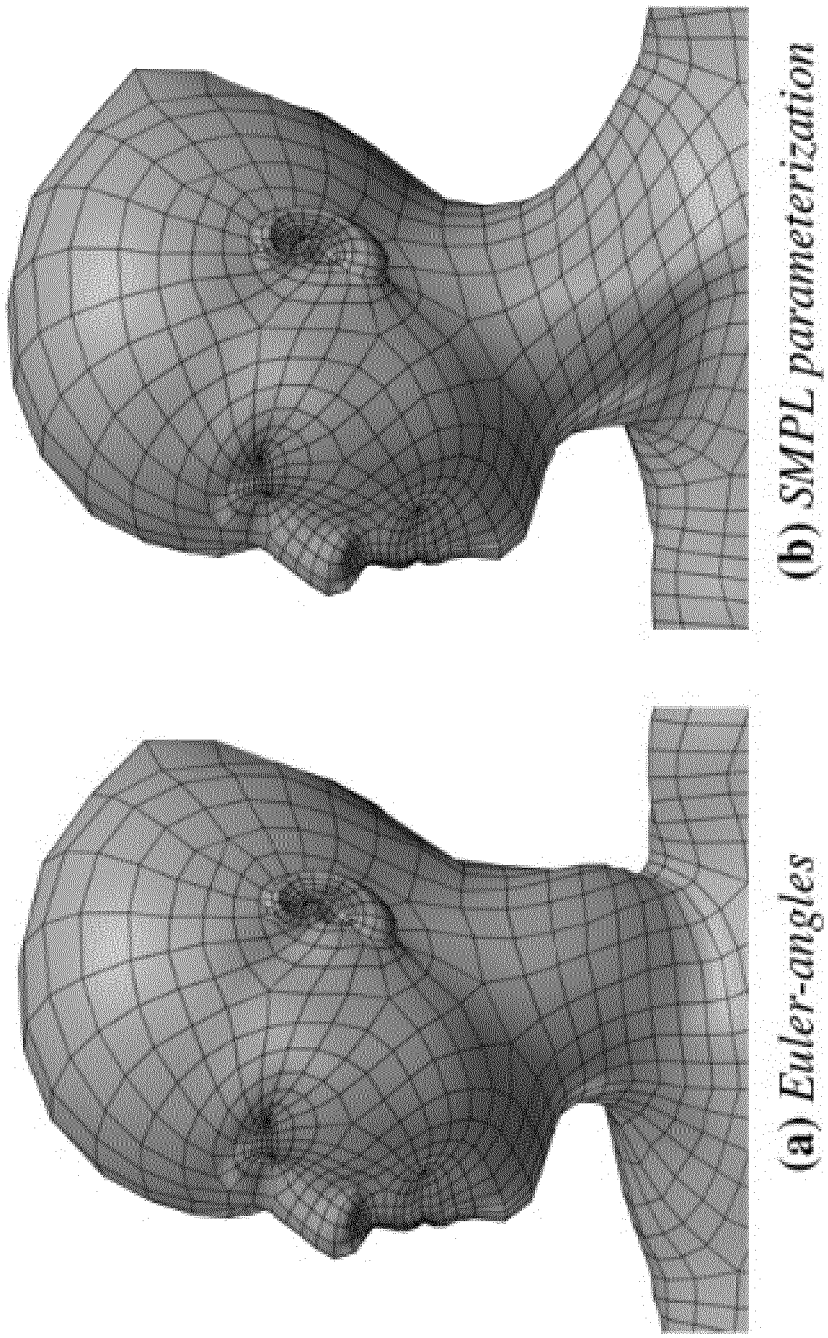
FIG. 16: shows parameterizing pose blend shapes. (a) Pose blend shapes parameterized by Euler angles cause significant problems. (b) the proposed parameterization allows the head to rotate in either direction with natural deformations.

In a further embodiment of the invention, pose blend shapes may be driven linearly from other features, such as raw $\vec{\theta}$, simple polynomials of $\vec{\theta}$, and trigonometric functions (sin, cos) of $\vec{\theta}$. Using raw $\vec{\theta}$ has limitations because the values vary between $-\pi$ and $\pi$. Imagine a twist of the neck (FIG. 16), which produces negative and positive angles about the vertical axis. Standard LBS will cause the neck to shrink as it rotates in either direction. To counteract this, a blend shape is required that increases the neck volume no matter which direction it rotates.

In general the raw rotations may be replaced with any functions of rotations and used to weight the blend shapes; for example, normalized quaternions.

The pose-dependent offsets of the basic SMPL model are not dependent on body shape. It is surprising how well SMPL works without this, but the general approach would likely not work if a space of nonrealistic animated characters were modeled, in which body part scales vary widely, or a space of humans that includes infants and adults. However, this limitation may be addressed by training a more general function that takes elements of $R^*(\vec{\theta})$ together with $\vec{\beta}$ to predict the blend shape coefficients. The dynamic blend shape coefficients of DMPL already depend on body shape and therefore the same approach can be used to make the pose blend shapes depend on body shape. This does not significantly complicate the model or run-time behavior, but may only require more training data.

As described, the basic SMPL model is a function of joint angles and shape parameters only: it does not model breathing, facial motion, muscle tension, or any changes independent of skeletal joint angles and overall shape. These can be learned as additional additive blend shapes (as with DMPL) if the appropriate factored data is available (cf. [Tsoli et al. 2014]).

While the segmentation of the template into parts, the topology of the mesh, and the zero pose are normally defined in the previous embodiments, these can also be learned.

SMPL uses 207 pose blend shapes. In same cases, this may be reduced by performing PCA on the blend shapes, reducing the number of multiplications and consequently increasing rendering speed. Also, the dynamic model uses PCA to learn the dynamic blend shapes but one may also learn the elements of these blend shapes directly as done for the pose blend shapes. Finally, instead of fitting the model to registered meshes one may also fit it to mocap marker data (cf. MoSh [Loper et al. 2014]), depth data, or video data.

The foregoing may also be understood in view of the following clauses:

1. Computer-implemented method for generating a digital representation of a body model, the body model having a shape and a pose, comprising the steps:
   obtaining a template shape (T), the template shape comprising vertices;
   applying a pose-dependent blend shape to vertices of the template shape (T), based on a pose of the body model; and
   applying a blend skinning procedure (W) to the result.

2. The method of clause 1, wherein the pose-dependent blend shape depends linearly on the pose.

3. The method of clause 1 or 2, wherein the pose-dependent blend shape comprise a vector of vertex offsets/displacements.

4. The method of clause 1 or 2, wherein the blend skinning procedure is either a linear blend skinning (LBS) or a dual-quaternion blend of skinning (DQBS) procedure.

5. The method of clause 1 or 2, wherein the pose-dependent blend shape is learned from a database of body shapes.

6. The method of clause 5, wherein the learned pose dependent blend shape both corrects errors caused by the blend skinning function and static soft-tissue deformations caused by changed in pose.

7. The method of clause 5 or 6, wherein the database is the CAESAR database.

8. The method of clause 1, 2, 3 or 4, further comprising the step of applying a shape-dependent shape blend shape to vertices of the template shape, based on the shape of the body model.

9. The method of clause 1, 2, 3 or 4, further comprising the step of applying a dynamic blend of shape to vertices of the template shape, based on the velocity and/or an acceleration of the body and/or limbs of the body model.

10. The method of clause 1, wherein the pose blend shapes are sparse.

11. The method of clause 1, wherein the pose-dependent blend shapes also depend on the shape of the body model.

12. The method of clause 1, wherein the blend skinning procedure is linear.

13. The method of clause 12, wherein the blend skinning procedure is applied based on locations of joints of a skeletal rig defining the pose of the body model.

14. The method of clause 13, wherein the locations of the joints are estimated based on the shape ($\beta$) of the body model.

15. The method of one of the previous claims, implemented on a graphics processing unit (GPU).

16. The method of one of the previous claims, further including the step of:
   exporting the body model in a cross-platform compatible file format, e.g. a Filmbox (FBX file format.

17. The method of clause 8 or 9, wherein the respective blend shape deformations are applied additively to the template shape (T)

18. The method of clause 9, wherein of breathing and/or muscle contraction are modeled as additional additive blend shapes.

19. The method of clause 1, wherein the pose-dependent blend shapes are function of elements of rotation matrices.

20. The method of clause 19 wherein the function in linear.

21. The method of clause 19, wherein the function is non-linear.

22. The method of clause 9, wherein the dynamic model is an autoregressive model.

23. Computer-implemented method for learning a digital representation of a body model, the body model having a shape and a pose, comprising the steps:
   learning pose-dependent pose blend shapes of the body model, based on a multi-pose data set;

storing the pose-dependent pose blend shapes of the body model on a non-volatile computer-readable medium.

24. The method of clause 23, wherein the multi-pose data set comprises one or more digital models of at least one individual that have been aligned to high-resolution 3D scans of the individual in different poses.

25. The method of clause 24, wherein the high resolution 3D scans are obtained from the CAESAR data set.

26. The method of clause 24, where in the individual has a female body.

27. The method of clause 23, wherein the pose-dependent pose blend shapes of the body model are learned by reducing a reconstruction error on the data sheet.

28. The method of clause 23, further including the steps of:
learning shape-dependent shape blend shapes of the body model, based on a multi-shape date set;
storing the shape-dependent shape blend shapes of the body model on a non-volatile computer-readable medium.

29. The method of clause 28, wherein learning a shape direction comprises running PCA on shape registrations from the multi-shape database after pose normalization.

30. The method of clause 27, wherein a registration is pose-normalized by minimizing a difference between registration and model edges.

31. The method of clause 23, where in a segmentation of the mesh into the parts is learned from data.

32. The method of clause 23, wherein a topology of the mesh is learned from data.

33. The method of clause 23, wherein a zero pose is learned from data.

34. The method of clause 23, wherein the pose blend shapes are reduced in dimension.

35. The method of clause 34, wherein PCA is used to reduce the dimension.

36. The method of clause 23, wherein a sparse representation is used.

37. Computer-program product, comprising a model learned according to the method of clause 23.

38. Computer-program product, comprising instructions that, when executed on computer, implement a method according to clause 1.

39. Using a digital representation of a body model generated according to clause 1 or learned according to clause 23 for marker-based and/or markerless to capture from range images, video and/or images.

REFERENCES

ALLEN, B., CURLESS, B., AND POPOVI'C, Z. 2002. Articulated body deformation from range scan data. ACM Trans. Graph. (Proc. SIGGRAPH) 21, 3 (July), 612-619.

ALLEN, B., CURLESS, B., AND POPOVI'C, Z. 2003. The space of human body shapes: Reconstruction and parameterization from range scans. ACM Trans. Graph. (Proc. SIGGRAPH) 22, 3, 587-594.

ALLEN, B., CURLESS, B., POPOVI'C, Z., AND HERTZMANN, A. 2006. Learning a correlated model of identity and posedependent body shape variation for real-time synthesis. In Proceedings of the 2006 ACM SIGGRAPH/Eurographics Symposium on Computer Animation, Eurographics Association, Airela-Ville, Switzerland, Switzerland, SCA '06, 147-156.

ANGUELOV, D., SRINIVASAN, P., KOLLER, D., THRUN, S., RODGERS, J., AND DAVIS, J. 2005. SCAPE: Shape Completion and Animation of PEople. ACM Trans. Graph. (Proc. SIGGRAPH 24, 3, 408-416.

BARAN, I., AND POPOVI'C, J. 2007. Automatic rigging and animation of 3D characters. ACM Trans. Graph. (Proc. SIGGRAPH) 26, 3 (July).

BOGO, F., ROMERO, J., LOPER, M., AND BLACK, M. J. 2014. FAUST: Dataset and evaluation for 3D mesh registration. In Proc. IEEE Conf. on Computer Vision and Pattern Recognition (CVPR), 3794-3801.

CHANG, W., AND ZWICKER, M. 2009. Range scan registration using reduced deformable models. Computer Graphics Forum 28, 2, 447-456.

CHEN, Y., LIU, Z., AND ZHANG, Z. 2013. Tensor-based human body modeling. In IEEE Conf. on Computer Vision and Pattern Recognition (CVPR), 105-112. 2000. CMU graphics lab motion capture database. http://mocap.cs.cmu.edu. Accessed: 2012 Dec. 11.

CORAZZA, S., AND GAMBAREITO, E., 2014. Automatic generation of 3D character animation from 3D meshes, August 5. U.S. Pat. No. 8,797,328.

DE AGUIAR, E., THEOBALT, C., THRUN, S., AND SEIDEL, H.-P. 2008. Automatic conversion of mesh animations into skeletonbased animations. Computer Graphics Forum 27, 2, 389-397.

2015. Dyna dataset. http://dyna.is.tue.mpg.de/. Accessed: 2015 May 15.

FREIFELD, O., AND BLACK, M. J. 2012. Lie bodies: A manifold representation of 3D human shape. In European Conf. on Computer Vision (ECCV), Springer-Verlag, A. Fitzgibbon et al.

(Eds.), Ed., Part I, LNCS 7572, 1-14.

HASLER, N., STOLL, C., SUNKEL, M., ROSENHAHN, B., AND SEIDEL, H. 2009. A statistical model of human pose and body shape. Computer Graphics Forum 28, 2, 337-346.

HASLER, N., THORM̈ AHLEN, T., ROSENHAHN, B., AND SEIDEL, H.-P. 2010. Learning skeletons for shape and pose. In Proceedings of the 2010 ACM SIGGRAPH Symposium on Interactive 3D Graphics and Games, ACM, New York, N.Y., USA, I3D '10, 23-30.

HIRSHBERG, D., LOPER, M., RACHLIN, E., AND BLACK, M. 2012. Coregistration: Simultaneous alignment and modeling of articulated 3D shape. In European Conf. on Computer Vision (ECCV), Springer-Verlag, A. F. et al. (Eds.), Ed., LNCS 7577, Part IV, 242-255.

JAMES, D. L, AND TWIGG, C. D. 2005. Skinning mesh animations. ACM Trans. Graph. 24, 3 (July), 399-407.

KAVAN, L, AND Z'ARA, J. 2005. Spherical blend skinning: Areal-time deformation of articulated models. In Proceedings of the 2005 Symposium on Interactive 3D Graphics and Games, ACM, New York, N.Y., USA, I3D '05, 9-16.

KAVAN, L, COLLINS, S., Z'ARA, J., AND O'SULLIVAN, C. 2008. Geometric skinning with approximate dual quaternion blending. ACM Transactions on Graphics (TOG) 27, 4, 105:1-105:23.

KAVAN, L, COLLINS, S., AND O'SULLIVAN, C. 2009. Automatic linearization of nonlinear skinning. In Proceedings of the 2009 Symposium on Interactive 3D Graphics and Games, ACM, New York, N.Y., USA, I3D '09, 49-56.

KRY, P. G., JAMES, D. L, AND PAI, D. K. 2002. EigenSkin: Real time large deformation character skinning in hardware. In Proceedings of the 2002 ACM SIGGRAPH/Eurographics Symposium on Computer Animation, ACM, New York, N.Y., USA, SCA '02, 153-159.

KURIHARA, T., AND MIYATA, N. 2004. Modeling deformable human hands from medical images. In Proceedings of the 2004 ACM SIGGRAPH/Eurographics Symposium on Computer Animation, Eurographics Association, Aire-la-Ville, Switzerland, Switzerland, SCA '04, 355-363.

LAWSON, C. L, AND HANSON, R. J. 1995. Solving least squares problems. Classics in applied mathematics. SIAM, Philadelphia, Pa. SIAM: Society of industrial and applied mathematics.

LE, B. H., AND DENG, Z. 2012. Smooth skinning decomposition with rigid bones. ACM Trans. Graph. 31, 6 (November), 199:1-199:10.

LE, B. H., AND DENG, Z. 2014. Robust and accurate skeletal rigging from mesh sequences. ACM Trans. Graph. 33, 4 (July), 84:1-84:10.

LEWIS, J. P., CORDNER, M., AND FONG, N. 2000. Pose space deformation: A unified approach to shape interpolation and skeleton-driven deformation. In Proceedings of the 27th Annual Conference on Computer Graphics and Interactive Techniques, ACM Press/Addison-Wesley Publishing Co., New York, N.Y., USA, SIGGRAPH '00, 165-172.

LOPER, M. M., AND BLACK, M. J. 2014. OpenDR: An approximate differentiable renderer. In Computer Vision—ECCV 2014, Springer, Heidelberg, D. Fleet, T. Pajdla, B. Schiele, and T. Tuytelaars, Eds., vol. 8695 of Lecture Notes in Computer Science, 154-169.

LOPER, M. M., MAHMOOD, N., AND BLACK, M. J. 2014. MoSh: Motion and shape capture from sparse markers. ACM Trans. Graph., (Proc. SIGGRAPH Asia) 33, 6 (November), 220:1-220:13.

MERRY, B., MARAIS, P., AND GAIN, J. 2006. Animation space: A truly linear framework for character animation. ACM Trans. Graph. 25, 4 (October), 1400-1423.

MILLER, C., ARIKAN, O., AND FUSSELL, D. 2010. Frankenrigs: Building character rigs from multiple sources. In Proceedings of the 2010 ACM SIGGRAPH Symposium on Interactive 3D Graphics and Games, ACM, New York, N.Y., USA, I3D '10, 31-38.

MOHR, A., AND GLEICHER, M. 2003. Building efficient, accurate character skins from examples. ACM Trans. Graph. (Proc. SIGGRAPH), 562-568.

NOCEDAL, J., AND WRIGHT, S. J. 2006. Numerical Optimization, 2nd ed. Springer, New York.

PONS-MOLL, G., ROMERO, J., MAHMOOD, N., AND BLACK, M. J. 2015. Dyna: A model of dynamic human shape in motion. ACM Transactions on Graphics, (Proc. SIGGRAPH) 34, 4 (July), 120:1-120:14.

RHEE, T., LEWIS, J., AND NEUMANN, U. 2006. Real-time weighted pose-space deformation on the GPU. EUROGRAPHICS 25, 3.

ROBINEITE, K., BLACKWELL, S., DAANEN, H., BOEHMER, M., FLEMING, S., BRILL, T., HOEFERLIN, D., AND BURNSIDES, D. 2002. Civilian American and European Surface Anthropometry Resource (CAESAR) final report. Tech. Rep. AFRL-HEWP-TR-2002-00169, US Air Force Research Laboratory.

ROUET, C., AND LEWIS, J., 1999. Method and apparatus for creating lifelike digital representations of computer animated objects by providing corrective enveloping, March 16. U.S. Pat. No. 5,883,638.

SCHAEFER, S., AND YUKSEL, C. 2007. Example-based skeleton extraction. In Proceedings of the Fifth Eurographics Symposium on Geometry Processing, Eurographics Association, Airela-Ville, Switzerland, Switzerland, SGP '07, 153-162.

SEO, H., CORDIER, F., AND MAGNENAT-THALMANN, N. 2003. Synthesizing animatable body models with parameterized shape modifications. In Proceedings of the 2003 ACM SIGGRAPH/Eurographics Symposium on Computer Animation, Eurographics Association, Aire-la-Ville, Switzerland, Switzerland, SCA '03, 120-125.

TSOLI, A., MAHMOOD, N., AND BLACK, M. J. 2014. Breathing life into shape: Capturing, modeling and animating 3D human 52:1-52:11.

WANG, X. C., AND PHILLIPS, C. 2002. Multi-weight enveloping: Least-squares approximation techniques for skin animation. In Proceedings of the 2002 ACM SIGGRAPH/Eurographics Symposium on Computer Animation, ACM, New York, N.Y., USA, SCA '02, 129-138.

WANG, R. Y., PULLI, K., AND POPOVI'C, J. 2007. Real-time enveloping with rotational regression. ACM Trans. Graph. (Proc. SIGGRAPH) 26, 3 (July).

WEBER, O., SORKINE, O., LIPMAN, Y., AND GOTSMAN, C. 2007. Context-aware skeletal shape deformation. Computer Graphics Forum 26, 3 (September), 265-274.

The invention claimed is:

1. A computer-implemented method comprising:
obtaining a template shape, wherein the template shape comprises vertices;
applying a shape-dependent blend shape to the vertices of the template shape, wherein the shape-dependent blend shape displaces the vertices of the template shape into a shape of a body model;
applying a pose-dependent blend shape to the vertices of the template shape, wherein the pose-dependent blend shape displaces the vertices of the template shape according to a static soft-tissue deformation associated with a pose of the body model; and
applying a blend skinning function to the vertices of the template shape, wherein the blend skinning function displaces the vertices of the template shape into the pose of the body model.

2. The computer-implemented method of claim 1, wherein the blend skinning function is at least one of a linear blend skinning function or a dual-quaternion blend of skinning function.

3. The computer-implemented method of claim 1, wherein the pose-dependent blend shape is identified from a plurality of pose-dependent blend shapes that are learned from a database of body scans depicting a plurality of different body shapes.

4. The computer-implemented method of claim 3, wherein the pose-dependent blend shape displaces the vertices of the template shape according to the static soft-tissue deformation in the body model and corrects errors caused by the blend skinning function.

5. The computer-implemented method of claim 3, further comprising identifying the pose-dependent blend shape from among the plurality of pose-dependent blend shapes based at least partly on the shape of the body model.

6. The computer-implemented method of claim 1, further comprising applying a dynamic blend shape to the vertices of the template shape,
wherein the dynamic blend shape is based at least partly on at least one of velocity and acceleration of at least a portion of the body model, and
wherein applying the dynamic blend shape displaces the vertices of the template shape according to a dynamic soft tissue deformation in the body model caused by the at least one of velocity and the acceleration.

7. The computer-implemented method of claim 1, wherein the pose-dependent blend shape is sparse.

8. The computer-implemented method of claim 1, wherein the blend skinning function is applied based at least partly on a location of a joint of a skeletal rig defining the pose of the body model.

9. The computer-implemented method of claim 8, further comprising estimating the location of a joint based at least partly on the shape of the body model, wherein estimating the location of the joint based at least partly on the shape of the body model comprises:
   accessing a learned joint regression function learned from a dataset including three-dimensional scans of a plurality of subjects in different poses; and
   computing the location of the joint from at least some of the vertices of the template shape, wherein the shape-dependent blend shape has been applied to the vertices of the template shape using the learned joint regression function.

10. The computer-implemented method of claim 1, further comprising:
    applying a first set of displacements to the vertices of the template shape, wherein the first set of displacements are due to the shape-dependent blend shape; and
    additively applying a second set of displacements to the vertices of the template shape with the first set of displacements applied, wherein the second set of displacements are due the pose-dependent blend shape.

11. The computer-implemented method of claim 10, further comprising additively applying a third set of displacements to the vertices of the template shape with the first and second sets of displacements applied, wherein the third set of displacements are based at least partly on at least one of breathing or muscle contraction.

12. The computer-implemented method of claim 1, wherein the pose-dependent blend shape is a function of an element of a rotation matrix.

13. A computer-implemented method comprising:
    accessing a template shape comprising a template mesh, wherein the template mesh includes vertices representing an exterior body surface;
    accessing a dataset including data representing at least a body scan depicting a body shape and a pose;
    learning a parameter for modifying the template shape into a shape and pose of a body model, wherein learning the parameter comprises:
      learning, from at least the body scan of the dataset, a shape-dependent blend shape function that deforms the vertices of the template mesh into the body shape, and
      learning, from at least the first body scan of the dataset, a pose-dependent blend shape function that deforms the vertices of the template mesh into the pose according to static soft-tissue deformations associated with the pose; and
    storing the parameter that is learned on a non-volatile computer-readable medium.

14. The computer-implemented method of claim 13, wherein learning the pose-dependent blend shape function comprises, for the first body scan:
    registering the template mesh to the body scan to generate a registered mesh;
    pose normalizing the registered mesh into a rest pose; and
    performing a principal component analysis on the registered mesh pose normalized into the rest pose to compute the pose-dependent blend shape.

15. The computer-implemented method of claim 13, wherein learning the pose-dependent blend shape function further comprises reducing a reconstruction error on the second subset of the dataset.

16. The computer-implemented method of claim 13, wherein learning the shape-dependent blend shape function comprises, for the first body scan:
    registering the template mesh to the body scan to generate a registered mesh;
    pose normalizing the registered mesh into a rest pose; and
    performing a principal component analysis on the registered mesh pose normalized into the rest pose to compute the shape-dependent blend shape.

17. The computer-implemented method of claim 16, wherein post normalizing the registered mesh comprises:
    minimizing a difference between a first edge of an average generic shape and a first edge of the body scan to generate a pose estimate mesh; and
    minimizing a difference between at a first edge of the registered mesh and a first edge of the pose estimate mesh to compute an estimated body shape that, when posed, corresponds to the registered mesh.

18. The computer-implemented method of claim 13, wherein the template shape further comprises a skeletal rig including a joint, and wherein the computer-implemented method further comprises learning a function for predicting a location of the joint for the body shape.

19. The computer-implemented method of claim 18, wherein learning the function for predicting the location of the joint comprises learning a regression matrix from the dataset, wherein the regression matrix models how to combine particular vertices of the template mesh to estimate the location of the joint.

20. The computer-implemented method of claim 19, wherein the function for predicting the location of the joint is computed using a non-negative least squares that weights particular vertices of the template mesh.

21. The computer-implemented method of claim 13, further comprising applying the parameter that is learned to the template mesh to generate the body model having the body shape positioned in the pose.

22. A non-transitory computer-readable medium storing instructions that, when executed, cause one or more processors to perform operations comprising:
    accessing a template body model comprising (i) a mesh including vertices representing an exterior body surface, and (ii) a skeletal rig including a joint positioned according to a default pose;
    applying a blend shape function to the mesh that transforms the mesh into a shape-specific mesh in which positions of the vertices correspond to a shape of a body model;
    applying a pose-dependent blend shape function that transforms the shape-specific mesh into a shape-and-pose-specific mesh in which the positions of the vertices account for a pose-dependent deformation of the exterior body surface; and
    posing the shape-and-pose-specific mesh in a pose by applying a blend skinning function to rotate at least some of the vertices around a center of the joint in the skeletal rig.

23. The non-transitory computer-readable medium of claim 22, wherein applying the blend shape function comprises:
   receiving a vector of at least one shape parameter; and
   generating, based at least partly on the vector, a blend shape sculpting of the mesh into the shape-specific mesh.

24. The non-transitory computer-readable medium of claim 23, the operations further comprising, to transform the mesh to the shape of the body model, applying a function to predict a location for the joint as a function of the at least one shape parameter.

25. The non-transitory computer-readable medium of claim 22, wherein a parameter of the blend shape function and a parameter of the pose-dependent blend shape function are learned from training data including at least one body scan.

26. The non-transitory computer-readable medium of claim 22, wherein applying the pose-dependent blend shape function comprises:
   receiving a vector of at least one pose parameter; and
   generating, based at least partly on the vector, a blend shape sculpting of the shape-specific mesh into the shape-and-pose-specific mesh.

* * * * *